United States Patent
Whalen et al.

[11] 3,943,617
[45] Mar. 16, 1976

[54] NOVEL APPARATUS AND SOLID STATE METHOD FOR CONVERTING SMALL PIECES OF METAL TO A WORKPIECE

[75] Inventors: Mark E. Whalen, Pepper Pike; Norman W. Trepanier, Rocky River; Robert A. Kraus, Shaker Heights; Joseph W. Malleck, Chagrin Falls, all of Ohio

[73] Assignee: Republic Steel Corporation, Cleveland, Ohio

[22] Filed: July 16, 1973

[21] Appl. No.: 379,781

Related U.S. Application Data

[62] Division of Ser. No. 122,110, March 8, 1971, Pat. No. 3,768,139.

[52] U.S. Cl. .......... 29/403; 29/420; 29/420.5; 29/184; 29/186; 425/421; 425/456; 425/78; 425/DIG. 46; 72/250; 72/189; 72/190; 100/38; 100/41; 100/DIG. 1
[51] Int. Cl.² .... B22F 3/16; B30B 13/00; B23Q 17/00
[58] Field of Search ......... 29/403, 420, 420.5, 184, 29/186; 100/35, 38, 232, 41, DIG. 1; 425/78, 421, 456, DIG. 46; 72/189, 190, 270, 250

[56] References Cited
UNITED STATES PATENTS

| | | | |
|---|---|---|---|
| 2,211,984 | 8/1940 | Paterson | 29/403 |
| 2,252,697 | 8/1941 | Brassert | 29/420.5 X |
| 2,290,734 | 7/1942 | Brassert | 29/420.5 X |
| 2,333,271 | 11/1943 | Paterson | 29/420.5 |
| 2,383,766 | 8/1945 | Brassert | 29/420.5 X |
| 2,794,386 | 6/1957 | Beecher et al. | 100/232 X |
| 2,985,101 | 5/1961 | Hillstrom | 100/232 X |
| 3,005,403 | 10/1961 | Van Endert | 100/232 X |
| 3,374,654 | 3/1968 | Vebing | 72/189 |
| 3,438,320 | 4/1969 | Raab | 100/35 |
| 3,475,807 | 11/1969 | Wise | 72/270 |
| 3,583,192 | 6/1971 | Kocks | 72/189 |
| 3,626,577 | 12/1971 | Trible | 29/403 |
| 3,626,578 | 12/1971 | Price et al. | 29/403 |
| 3,660,544 | 5/1972 | Young et al. | 425/8 X |
| 3,744,118 | 7/1973 | Whalen et al. | 29/403 |
| 3,783,494 | 1/1974 | Whalen et al. | 29/403 |

*Primary Examiner*—C. W. Lanham
*Assistant Examiner*—V. K. Rising
*Attorney, Agent, or Firm*—Watts, Hoffmann, Fisher & Heinke Co.

[57] ABSTRACT

A method of converting scrap or other small pieces of metal into a useful, commercial product while maintaining the metal in a solid state. According to the process, the pieces are maintained together for further processing. They are impacted, while heated, to produce a metal body and thereafter subjected to continued impaction so that the pieces forming the body are welded together into a cohesive, homogeneous slab. There is also disclosure of a novel press and method of operating the press. The press is of the harmonic type. Its novel aspects include control of movement of novel platens during rotation of shafts which drive the platens and perimetral constraint of a workpiece being forged to achieve rapid impaction and self feed of a workpiece.

There is also disclosure of a novel method for making flakes of steel, a novel furnace including seals for maintaining the furnace gas-tight, a novel method in which the pieces of metal are scrap steel and baled together into a bale in which the scrap pieces of random size and shape become intertwined together and novel processes and apparatus for cleaning scrap or other metal pieces.

39 Claims, 34 Drawing Figures

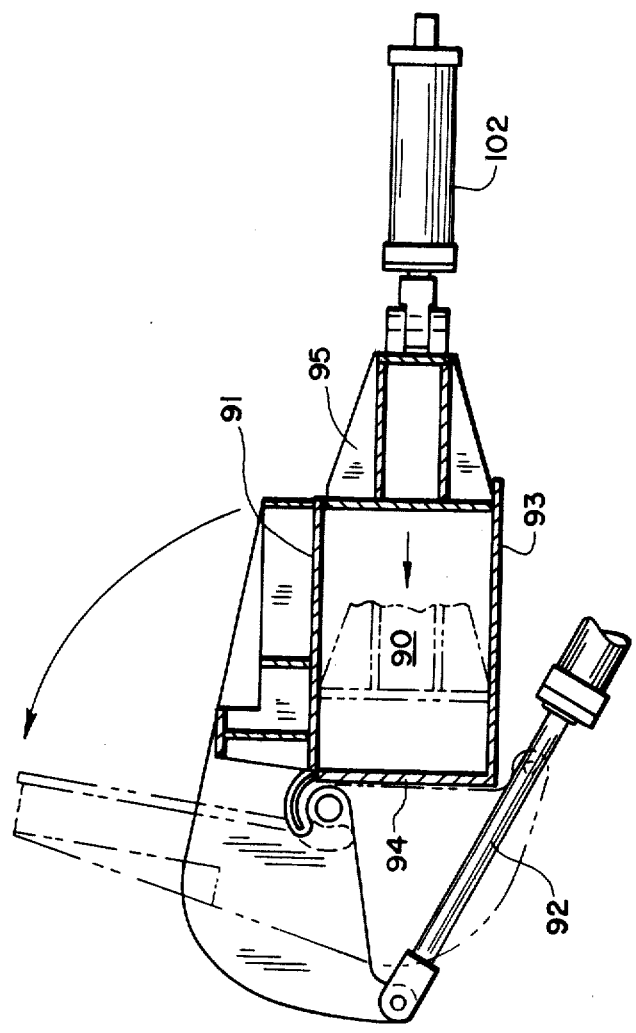

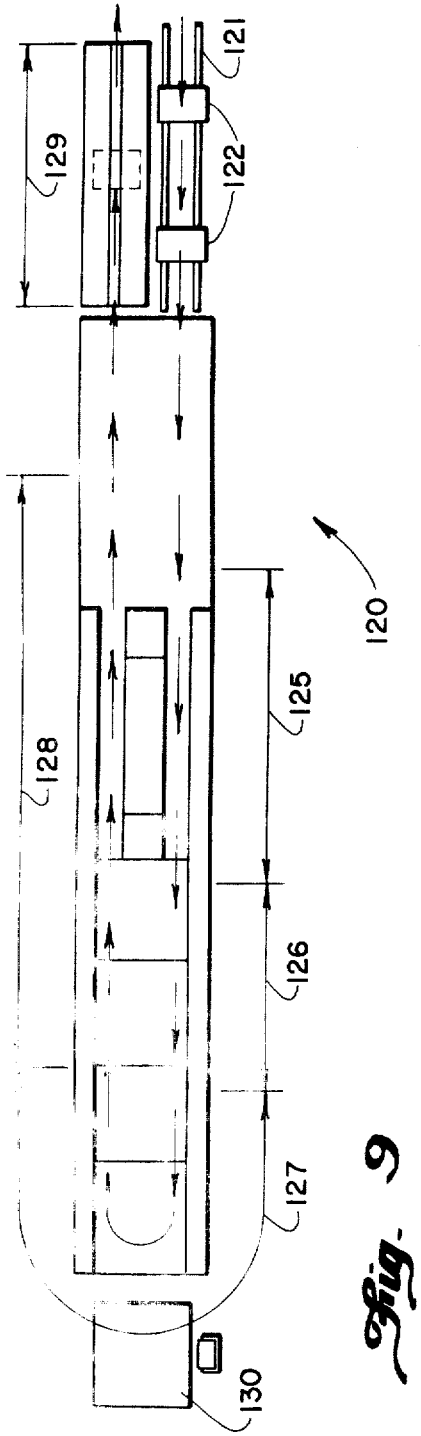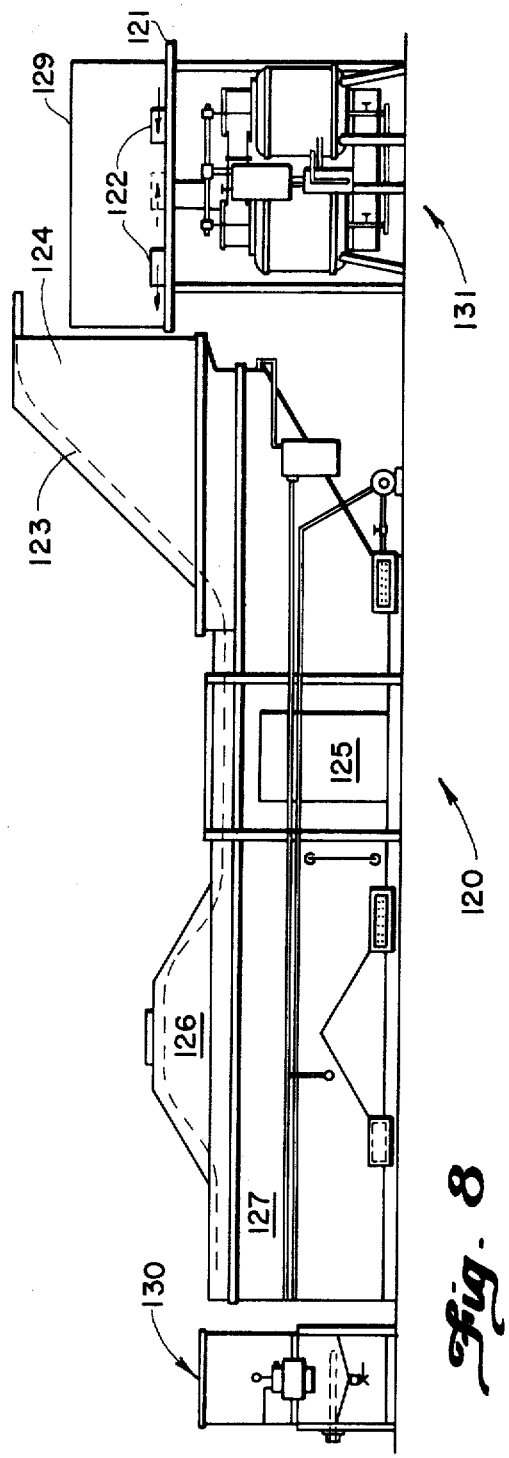

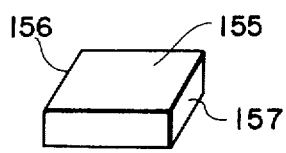
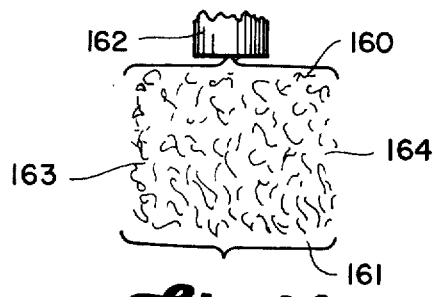
Fig. 13
Fig. 14
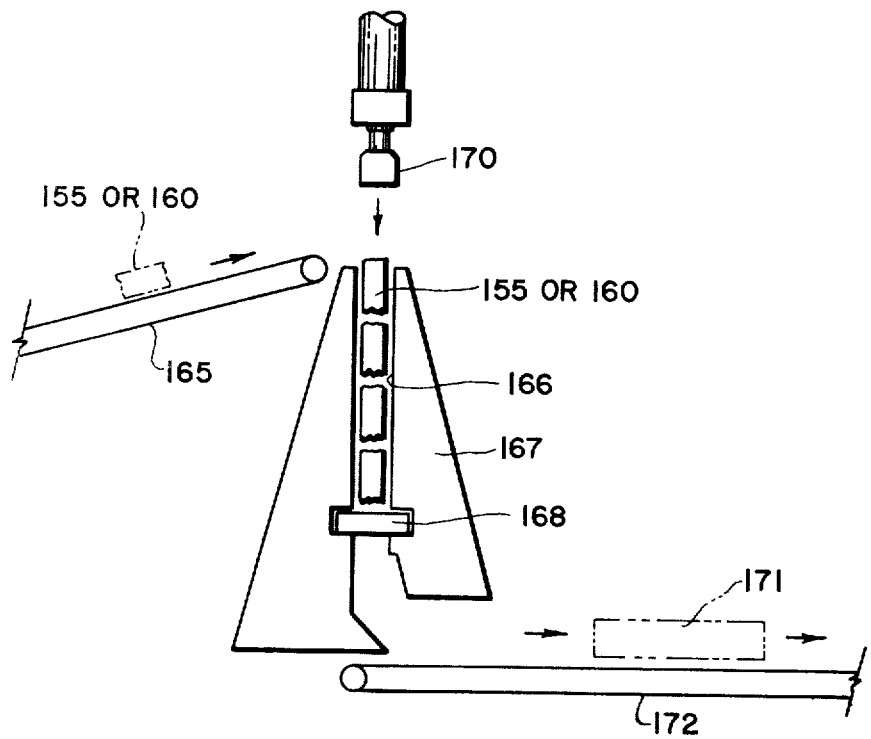
Fig. 15

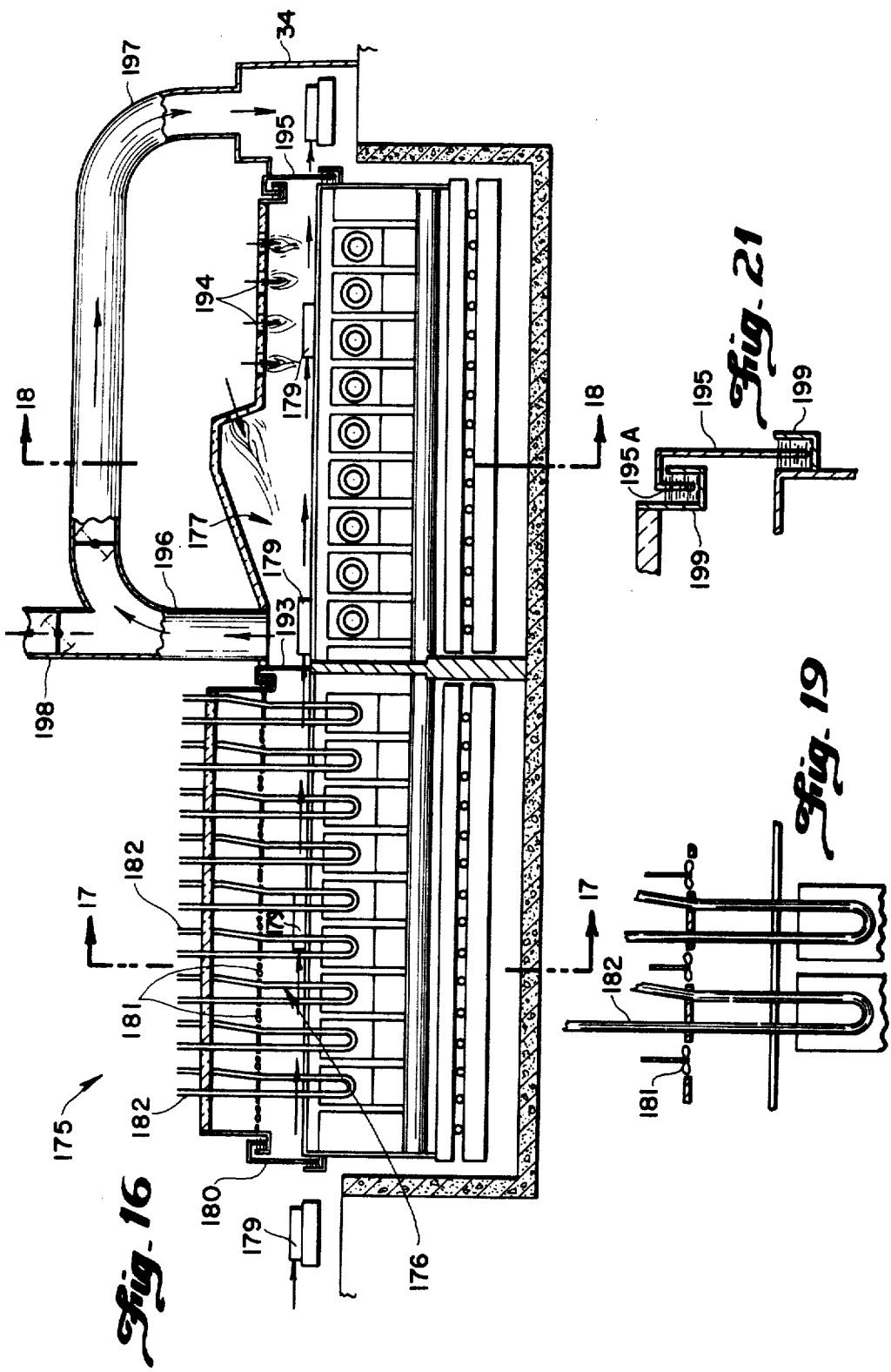

NOVEL APPARATUS AND SOLID STATE METHOD FOR CONVERTING SMALL PIECES OF METAL TO A WORKPIECE This is a division, of application Ser. No. 122,110, filed Mar. 8, 1971 U.S. Pat. No. 3,768,139.

CROSS REFERENCE TO RELATED APPLICATIONS

United States Patent application Ser. No. 121,861 filed Mar. 8, 1971 herewith by Mark E. Whalen, et al entitled SOLID STATE METHOD FOR CONVERTING SMALL PIECES OF METAL TO A WORKPIECE.

United States Patent application Ser. No. 164,789 filed July 21, 1971 by Mark E. Whalen, et al entitled APPARATUS AND SOLID STATE METHOD FOR CONVERTING SMALL PIECES OF STEEL TO A WORKPIECE, which application is a continuation-in-part of application Ser. No. 122,110 filed Mar. 8, 1971.

BACKGROUND OF THE INVENTION

Field of the Invention

This invention relates to a method of converting scrap metal pieces to a body of solid metal useful in a manufacturing operation and additionally the resulting product of such method and the apparatus for carrying out the conversion.

Description of the Prior Art

It is well known that in conventional commercial processes for the conversion of scrap steel to commercial steel, the scrap metal is melted and then processed with conventional steelmaking techniques. Except for the melting step, such scrap conversion does not employ any processes which are uniquely demanded by the presence of scrap.

It has long been recognized that scrap metal, particularly a type known as "prompt industrial" resulting from automotive car body stampings, is of high quality and that there should be some method of utilizing it as a raw material without the expense of returning it almost to the start of the conventional steelmaking cycle. This recognition has led to proposals for the conversion of scrap steel into a useful solid-steel product while maintaining the steel in its solid state. While there have been a number of such proposals, none has achieved a useful commercial acceptance. While there are many contributing factors in the failure of prior proposals, the principal factors are believed to be:

1. Where it has been proposed to continuously compress pieces of scrap together to cause them to weld into a useful product, there has not been a recognition of the need for inhibiting dissipation of the compressive forces laterally with respect to planes in which the forces are applied and particularly with respect to the utility of strain rate control.
2. The processes were such as to degrade rather than enhance the qualities and properties of the steel raw material with the result that the finished product, if one could be achieved at all, was of little commercial value.
3. There has been a failure to properly select and segregate scrap so that the scrap used as raw material is compatible to produce a good quality finished product from a solid state process.
4. Prior proposals to convert scrap to solid steel via compression have not sufficiently reduced the thickness of a given volume of scrap to achieve full homogeneity and welding of the components.

SUMMARY OF THE INVENTION

The methods and apparatus of the present invention allow great latitude in (1) the selection of the quality of the steel to be produced by the process; (2) the proximity of the scrap to the location where the useful steel is produced; (3) the source of pieces to be converted to a useful product by a solid state process; and (4) the required capital investment which can vary materially according to the quality and the quantity of product to be produced.

While there are many variations in the process, in any of its forms it includes the steps of:
1. Maintaining pieces of metal together for further processing.
2. Heating the pieces of metal.
3. Impacting the pieces while hot to produce a metal body and thereafter continuing the impaction of the body so that the pieces forming the body are welded together into a cohesive, homogeneous slab.

Since there are many variations according to the conditions encountered, a particular situation is selected to trace the process through in a preferred system for making high-quality steel from scrap. Specifically, many automotive stamping plants use very high quantities of high-quality sheet steel. These plants produce, as a result, relatively large quantities of steel scrap which is of fairly uniform chemical consistency. In converting the scrap to useful steel, scrap having a chemistry substantially that which is desired in the finished product is segregated. The scrap is taken to balers where it is mechanically compressed into bales. The scrap comprises about 50 percent of the volume of the finished bale. The bale is then sprayed with oil to protect the scrap against oxidization during transit to a location where the bales are converted to usable commercial steel.

In this example of the present invention, the baling is important. By utilizing baling techniques with an admixture of sizes and shapes of pieces of scrap, the scrap itself becomes interlaced and intertwined to provide a cohesive body. The cohesiveness of the body contributes to the inhibition of force dissipation when the body is impacted. Thus, the interlocking pieces of scrap themselves resist force dissipation longitudinally of the bale as the bale is progressively compressed in a peripherally constraining manner for cross sections advancing through the press.

The next step in the process is to clean the steel in the bales. A preferred technique is to use an automated cleaner which immerses the bale in a solvent such as trichloroethylene. The cleaned bales are then joined together to form "jumbo" bales. The bales are joined together through a novel welding or other novel procedure described in greater detail presently.

The jumbo bales are transported to a two-zone furnace and heated to from 1400°F. to 2000°F. for a subsequent conversion of the bale to a slab of homogeneous steel. It should be noted that while this is a practical commercial range, temperatures of from 1250°F. to melting can be employed.

The first zone of the furnace contains an inert atmosphere created by natural gas plus stoichiometric ambient air not to exceed 85 percent. The first zone mixture is combusted so as to achieve heating of the jumbo bale up to 1292°F. which is the carburization risk temperature. The second zone is provided with a reducing atmosphere generated by the combustion of natural gas with a 50 percent stoichiometric oxygen and/or heated air so as to achieve a terminal temperature in the jumbo bale of about 1800°F.

While under the influence of the reducing atmosphere to protect against chemical reaction of the constituents, the jumbo bale is delivered from the heating furnace to the entrance of a novel harmonic forging press for forging while hot.

The harmonic press plays a very important role in successfully converting the bale to solid steel. The press has side restraints of the width of the original jumbo bale. This constrains the bale against lateral movement as it is forged and therefore against lateral dissipation of the forces. The platens are driven at harmonic speeds of the order of twelve revolutions per second (rps). by impacting the bales at these very high speeds, the forces effect high pressure compression and therefore molecular migration and welding in planes transverse to the path of workpiece travel. The sharpness and quickness of the impactions is such that the longitudinal dissipation of the impacting forces is essentially avoided. It will be appreciated that tremendous forces of typically the order of 20,000 psi and in the range of 9800 psi to 45,000 psi must be imposed on the bale in order to effect a welding in the temperature range here involved.

The bale is forged by the press until it is in solid condition. The forging by the press continues until the thickness of the bale is reduced an additional 30 percent or more after reaching solid so that the bale leaves the press in the form of a solid slab of steel. During this forging, the bale is perimetrally restrained so that the sharp, rapid impactions by the platens impact high forces substantially in planes. These high forces in the appropriate conditions of confinement and temperature cause molecular migration and welding of the scrap into a homogeneous, unitary slab.

Upon completion of the harmonic compaction work, preferably solid in one pass and to finished dimension in two or three passes, the formed slab is transferred to a holding station or directly fed to the reheating furnace of a hot strip finishing line where an oxidizing atmosphere up to approximately 2550°F. is normally employed. Then, the formed slab is subjected to multiple roughing stands and a finishing train and standard conventional cold strip process for producing deep drawing quality sheet. This method of steel forming provides an increase in yield over conventional steelmaking practices using melting.

Of particular significance is the fact that each time the workpiece is heated during the above conversion process, it is done at temperatures above solution conditions so that the deep drawing quality of the scrap materials is not lost and in fact may be regained, by following certain process procedures such as hot rolling above 1600°F. and coil below 1050°F; cold reduce 50–65 percent and box anneal for about 10–12 hours at 1050°F.

Where these properties are to be regained or retained, in the heating furnace prior to hot press forming, the temperature is above 1800°F. and in the reheating furnace for strip finishing, the formed slab temperature is about 2350°F. Therefore, one aspect of a unique process combination that has been achieved is whereby conventional hot strip finishing facilities can be connected in series to the novel scrap slab process to achieve retainment and regainment of deep drawing metallurgical qualities of the starting materials.

As has been indicated, the preceding summary is of a typical application of the processes and apparatus of this invention. As has also been indicated, there are many variations which can be used. Subsequently, these variations are all described in detail. Prior to that detailed description in an introductory and summary discussion, some of the more important variations and additional novel aspects of the invention are presented.

The principal variants and novel subjects which are available are in:
1. Selection and production of the raw material.
    A. Non scrap pieces.
    B. Scrap treatment and variations.
2. The Furnace and treatment in it.
3. The harmonic press.
4. Treatment of a slab.

The remainder of this introductory will be divided into separate sections discussing these four areas of variation and specific novelty.

1. RAW MATERIAL

A. Non Scrap

In addition to segregated scrap, the raw material may be from 0 percent to 100 percent steel particles which are not derived as scrap. For example, steel flake made in a manner described in greater detail later may be employed. In addition, steel pellets may be used. These flake or pellet pieces are secured together by baling, or otherwise compressing the pieces, while hot, to form a workpiece.

In addition to the outstanding results which can be achieved by control of the chemistry of the initial product through the sorting and segregation of scrap as described, or utilization of 100 percent steel pellets or flake, the results can be further controlled by mixing scrap and steel powder, pellets, or flake. Powder is especially desirable since it has lubricating properties which are beneficial to the harmonic press.

This powder can be applied in any of several ways. In one application, the powder is admixed through interstices of the bale after it has been partially compressed but has not yet reached solid. This distributes the powder throughout the bale to provide a substantial homogeneous variation in the chemistry according to that which has been added. In addition, the powder can provide a laminate of a chemistry different from the chemistry of the scrap on one or both surfaces of the finished slab or in a central plane.

More specifically, as the bale is forged into a solid slab, small portions of the steel of the slab will be forced between the side restraints and the sides of the platens. The finished slab has, then, a projecting lip along each corner. Powder can be applied to the surface between these lips, using the lips as a powder restrainer. The slab is again passed through the harmonic press. Under appropriate conditions of temperature, pressure and strain rate, this powder is converted to a solid steel, forming a surface laminate on the slab. The slab can then be inverted and powder applied to the obverse surface so that the slab becomes a sandwich with layers formed from powder on upper and lower surfaces and a central portion formed from the scrap. Conversely, powder may be placed between two slabs and the slabs then further impacted to provide a layer from the powder intermediate upper and lower layers of steel produced from the scrap.

B. Scrap treatment and variations.

Most surprisingly, it has been found that, other than oils which should be removed, the dirtiness or lack of cleanliness of scrap is not a major obstacle to obtaining an integrated body of steel by this process. Should such scrap be processed without any attention to the cleaning, it has been found that the bale body temperature should be raised to or above a lower critical temperature ($Ac_3$) so that grain growth will take place across interfaces upon cooling from the hot harmonic compaction. The dirt will be minutely dispersed or exploded throughout the steel during the high energy impact of the hot press and will not interrupt the bonding of surfaces. As long as the surfaces have been adequately bonded, the volume fraction of the dirt will present no problem in terms of the basic mechanical structure of the resulting steel.

While there has been this surprising finding, there are circumstances where it is desirable to clean the scrap prior to baling. Such specialized cleaning is justified when (1) the quality of the finished product must have a certain design cleanliness or (2) the baling operation is adjacent to the operation in which steel slabs are made from the bales and it is more feasible and practical to clean before rather than solvent clean after baling.

As one significant specialized technique, shot blasting of loose scrap has proved to have particular advantage in that it tends to dimple, rough, or provide an non-flat condition for the scrap surfaces which promote healing during bonding. One preferable method utilizing shot blasting is to combine it with flame impingement in a two-stage cleaning operation whereby oil residues are removed prior to the shot blasting treatment so as to make the shot blasting treatment more effective. This is may be carried out in a rotary kiln under a slightly reducing atmosphere provided to remove both oil residues—such as palm oils or other synthetic oils or etc. used as lubricants in stamping operations—and surface oxides which may be on the scrap.

The scrap is slowly heated from 700°F. to 1000°F. in an atmosphere 45 percent to 55 percent stoichiometric air so that the oils and other combustible residues are vaporized off. Clean scrap is then shifted to a tumbling and shot blasting apparatus and finally transported to a baler. If the cleaning equipment is remote from the baling location, the clean scrap will, of course, be protected in transit and likewise, if the baling operation is remote from steel finishing operations, the bales will be protected similarly.

Another available variation in the raw material results from the discovery that if the materials contain large percentages of tin plate or galvanized stock they can be used. It has been found that the very thin alloy layers existing between such coated stock (for example, the alloy between the outer tin coating and the base metal, or in the case of galvanized stock, the zinc alloy interposed between the outer zinc coating and the substrate), these alloys constituents actually operate to assist and promote the bonding of the scrap pieces during the scrap conversion process described herein. This probably results from different temperature bonding relationship such alloys have.

Another raw material variation occurs where unusually high and severe quality limitations are placed on the end product. Then commercial quality steel sheets are placed adjacent to the sides of the scrap during the baling operation and become adhered to the scrap as a result of the baling forces. These sheets are not fabricated to form an enclosure in any manner but rather simply laid in place for eventual interlocking by the bales.

2. THE FURNACE AND TREATMENT IN IT

In order to precisely control the atmosphere within the furnace and to minimize the escape of furnace gases, novel seals have been designed. These seals comprise troughs with molten lead or mercury into which depressions extend. Thus, depending sheets provide seals along the walking beams used to transport the "jumbo" bales through the furnace. In addition, the end doors have depressions which project into troughs to effect sealing of the doors.

With a controlled oven atmosphere, a number of variations and options are available. For example, it is possible through the use of this inventive method to produce a scrap-slab characterized as rimming steel in that the surface region consists of purer metal with high-quality smoothness. This is normally created in conventional steelmaking processes by decarborizing or cleansing the outer portions of an ingot. According to the disclosure herein, it is possible to provide a rimmed product by utilizing bales of higher densities than normally employed, above 60 percent dense, and subject such bales to an oxidizing atmosphere as a first zone of the heating furnace for hot press work. The effect of the oxidizing atmosphere will be to permeate only the outer points of the scrap body and clean and decarborize such portions. Immediately following the oxidizing atmosphere, the body is subjected to a second zone having a heavily reducing atmosphere to remove the products of such oxidation. The core of the bale is substantially unaffected by such atmospheres because the bale is not exposed to the furnace gases a sufficient time to permit penetration to any significant degree.

3. THE HARMONIC PRESS

The hot press, and its method of operation, form a very important function of this invention. The press has been designed to implement the discovery that effective solid state bonding of steel can take place only if higher energy levels over the prior art are imparted to predetermined localized regions of impaction. Adequate energy levels are not achieved by solely raising mechanical pressures.

Plastic flow is inherently limited or localized in a direction toward either of the platens and novel side restraints. Longitudinally of the workpiece, along its path of travel substantially, it is only through the concept of the increase in strain rate applied uniformly and the cohesiveness of the workpiece that the flow becomes limited for influencing bonding. The lack of an appropriate strain rate applied variably by conventional equipment, such as rolling mills and bar forming apparatus, present noticeable deficiencies such as core delamination, ragged edges when scrap metal is processed, etc.

As the bale commences to feed between the platens, clearly only a leading portion of the platens will strike the bale. Reaction forces imposed on the press under these circumstances are severe. One of the features of the present invention is the provision of an adjustable platen control mechanism which adjusts the paths transcribed by the platens to minimize the reaction forces until the bale is fed into the press and the reaction forces become balanced. Then the press is adjusted to provide an optimized, self-feeding and impacting cycle.

This adjustment of each of the platens is provided by connecting each platen to the frame with an arm that is preferably of adjustable length. In the initial stages of feed of a bale into the press, any point on a platen transcribes a substantially elliptical pattern having a major axis which is normal to the path of workpiece travel. Thus, when the platen is so constrained its movement becomes substantially a reciprocal movement toward and away from the workpiece even though driven by an eccentric which is traversing a circular motion.

Once the bale has been fed sufficiently into the press that a leading portion of it is converted to a solid slab and the full platen surface, or a substantial part of it, is striking the bale, the arm restrainer is adjusted so that a given point on the platen has a substantial component of movement generally paralleling the path of workpiece travel. The platen adjustment may for example be to a condition where it is traversing an ellipse having its major axis paralleling the path of workpiece travel or to any movement between the two described elliptical patterns.

The platen employed is also novel. Each platen is generally convex in a plane of cross section paralleling the path of workpiece travel and staight in a plane of cross section transverse to the path of workpiece travel. The platen includes a leading, initial engagement and compression portion, a central serrated and feed portion, and a trailing and smoothing portion which smooths out surface irregularities caused by the serrations. The serrations are shaped such that surfaces are from 15° to 45° from a perpendicular with the path of workpiece travel so that forces are imparted substantially along so-called slip planes.

Slip planes are planes along which the steel components of solid steel tend to move relatively. Since the forces are applied to the bale along these slip planes and the welding is formed in the slip planes, rather than in some plane at an angle with the slip plane, there is minimal force dissipation in a slip plane, since it is the welding plane.

4. TREATMENT OF A SLAB

While, as indicated earlier, conventional cold strip processing may be utilized, in the preferred arrangement the bale is transported immediately, and while still hot, to a mill of the planetary type or a new generation harmonic rolling mill described herein. The purpose of the immediate transport of the slab to a mill is to minimize the reheating of the slab for a subsequent rolling operation and, in addition—and perhaps more important—any remote tendency of the slab components to delaminate as it is known is completely eliminated by the immediate conversion of the slab to sheet steel of a thickness no more than 1/20th of the thickness of the original bale.

Other objects and a fuller understanding of the invention may be had by referring to the following description and claims taken in conjunction with the accompanying drawings.

BRIEF DESCRIPTION OF THE DRAWINGS

FIG. 7 is a sectional view of the baler as seen from the plane indicated by the line 7—7 of FIG. 6;

FIG. 8 is a schematic side elevational view of apparatus for cleaning a bale of steel scrap;

FIG. 9 is a top plan view of the device of FIG. 8;

FIG. 13 is a schematic showing of a bale in which ends thereof have not been compressed;

FIG. 14 is a schematic showing of a technique for "exploding" a bale to produce uneven ends thereon;

FIG. 15 is a schematic view of press mechanism for joining together bales of the types shown in FIGS. 13 and 14;

FIG. 16 is a sectional view of a two-zone furnace utilized in this invention;

FIG. 19 is an enlarged sectional view of a portion of the furnace of FIG. 16;

FIG. 21 is an enlarged sectional view of end doors of the furnace and mercury seals used to effect a gaseous seal as bales are transported through the furnace by the walking beam;

DESCRIPTION OF THE PREFERRED EMBODIMENT

For clarity, the specification will be broken into ten separate sections. These sections are:

I. The Overall Process

II. Cleaning of the Scrap

III. Baling of the Scrap

IV. Bale Cleaning

V. Bale Joining

VI. Bale Heating

VII. Bale Compaction

VIII. Slab Rolling

IX. Powder Application

X. Flake Production

I. THE OVERALL PROCESS

Figure 1:
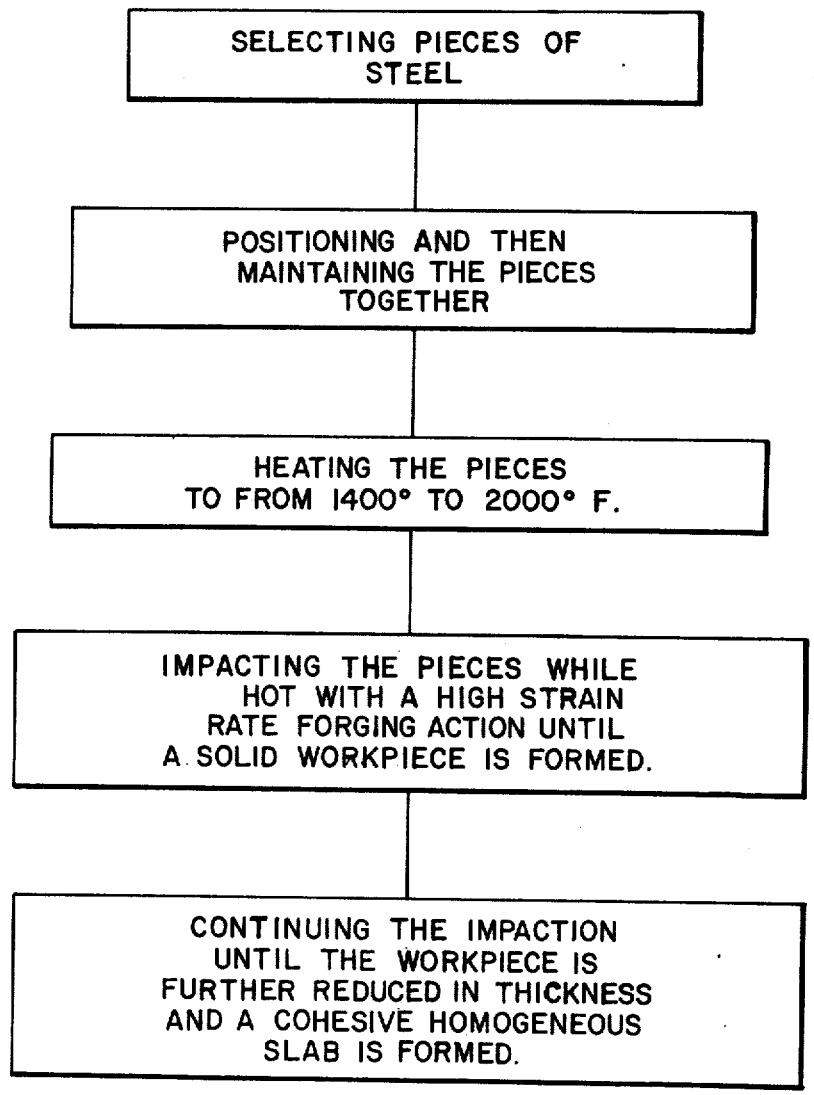
FIG. 1 is a flow diagram of the process.
Figure 2:
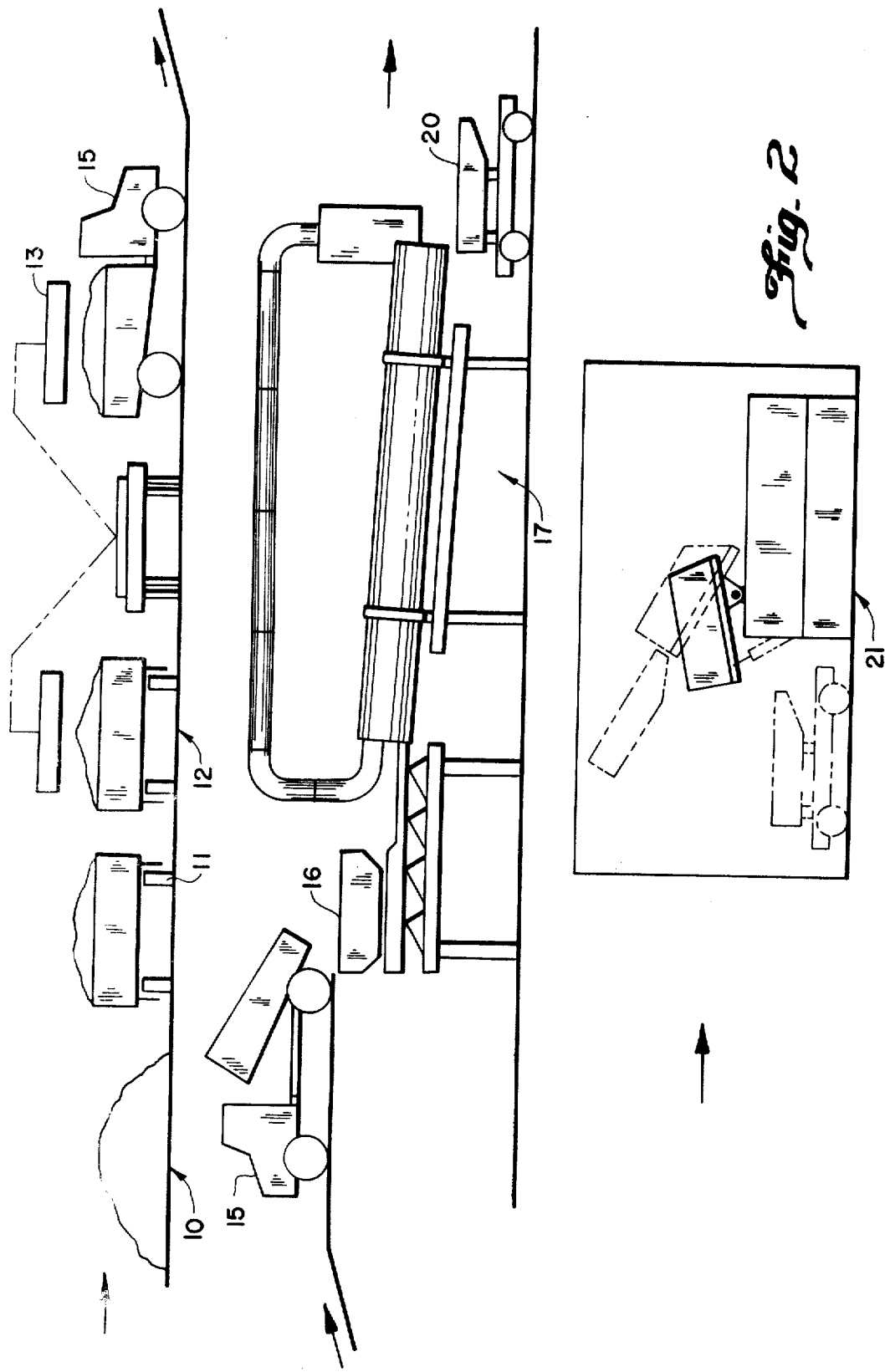
FIG. 2 is a schematic diagrammatic view of the steps performed at the location where scrap is generated including cleaning of the scrap and then baling of it.
Figure 3:
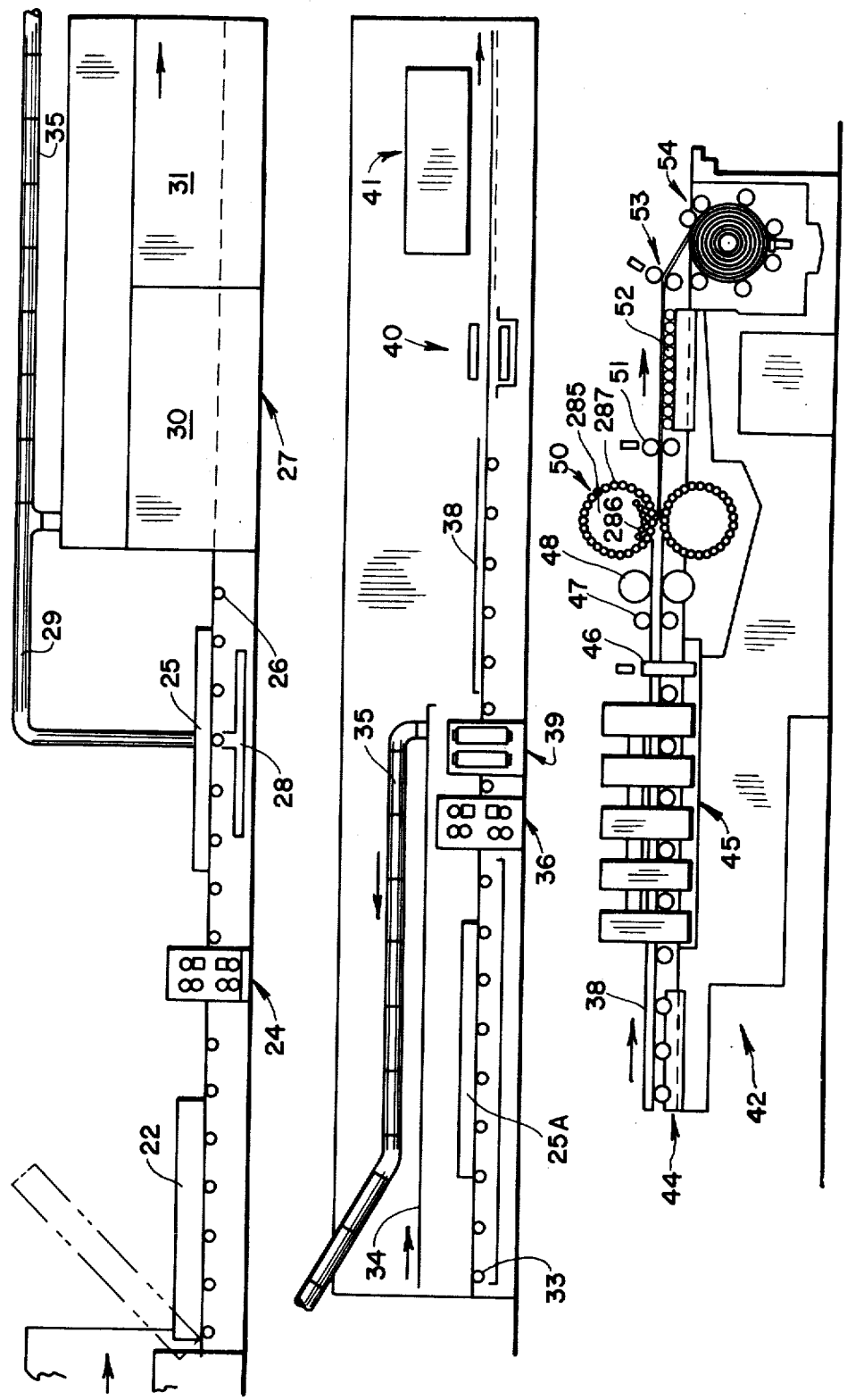
FIG. 3 is a schematic view of the processes employed in converting a bale of scrap to a coil of steel strip.

Referring now to FIGS. 1–3, FIG. 1 is a flow diagram of the process, while FIGS. 2 and 3 together are a schematic diagrammatical view of the flow of material from scrap to finished steel sheet in a high volume application of the invention. The equipment shown there has a capacity of the order of 300 tons per hour.

Referring specifically to FIG. 2, a pile of scrap is depicted at 10. This scrap pile depicts a segregated scrap pile composed of steel scrap having a chemistry of the desired finished process. For example, the scrap ideally will be steel having a carbon content of from 0.1 percent to 0.5 percent and will be a gauge of 0.07 inch or less in random shapes.

The scrap is diagrammatically shown as loaded in a freight car 11 for transport to another location indicated at 12. At the location 12, an electromagnet 13 is shown transferring the scrap to a truck shown schematically at 15. The truck 15 then transports the scrap to a charge hopper 16 for charging the scrap into a rotary kiln shown generally at 17.

As will be explained in greater detail presently, in that situation where the finishing of conversion of the scrap to a usable solid steel product is at some location reasonably remote from the scrap source and baling operation, the rotary kiln 17 will normally not be used. The kiln 17 is ideally used in that situation where the scrap is converted to solid steel at a nearby processing plant or where a special quality finished product is desired.

The depicted kiln is one in which a reducing atmosphere of from 700°F. to 1000°F. is employed. The reducing atmosphere will be composed of natural gas and oxygen with a mixture which is 45 percent to 55 percent stoichiometric. The principal purpose of the kiln is to remove oils and residues such as palm oil without producing a blue oxide on the steel. If the steel scrap is excessively oxidized or enhanced bonding at lower temperatures is desired, it is shot blasted subsequent to its treatment in the rotary kiln.

After the scrap has been cleaned in the kiln, it is transported to a baler. In FIG. 2, a transport car 20 is shown schematically for this purpose. The scrap is charged into a baler 21. Here the scrap, which is an admixture of random sizes, is compressed by a pressure of the order of 1,000 to 7,500 pounds per square inch until it is from 20 percent to 50 percent densified and preferably approximately 35 percent dense when the bales are to be joined by welding. By these percentages it is meant that scrap is typically formed into a bale in the shape of a rectangular solid with a preferred 35 percent of the volume of that solid being steel. Thus, The bales are compressed to a condition for transport from the baler when they weigh from 100 to 300 pounds per cubic foot.

The baling of an admixture of random sizes is highly important to the performance of the process of this invention. As will become more apparent presently, the baling causes the scrap pieces to become physically intertwined and interlocked to provide a bale having an inherent strength and rigidity. The strength and rigidity not only serves a more conventional function of facilitating the transport of the scrap in a condensed way, but also, more importantly, is a major factor in inhibiting longitudinal dissipation of impact forces during a subsequent forging operation.

If the scrap, prior to baling has been cleaned in a kiln 17, it is next placed in covered railroad cars and the like for transport to the location of subsequent stages of the process. If, however, kiln cleaning is avoided as has been suggested above, it is preferred that the bales be oil immersed to protect them during shipment and then shipped to another location for further processing.

Referring now to FIG. 3, a bale 22 is shown being delivered to a cold harmonic press 24. If the bale has been oil coated for shipment, or, in any event, not precleaned, a solvent cleaning with trichloroethylene is performed in a manner which will be described in greater detail in Section IV. The bale cleaning is not shown in the schematic presentations of FIGS. 2 and 3.

The bale 22 is fed to and through the cold harmonic press 24 for compression until it is from 60 percent to 80 percent or 90 percent dense. Preferably it is compressed until it is about 75 percent dense. In short, it is compressed until the rectangular solid represented by the compressed slab 25 is a volume which is preferably 75 percent metal, by volume.

The cold press can, as will be described in greater detail in Section VII be eliminated. Its principal functions are to assist in the economic utilization of equipment further downstream in the steel formation process. Specifically, a more compressed bale is more efficiently and expeditiously heated in the ovens and, since less reduction is required obviously more efficiently and expeditiously fully compressed in a subsequent hot compression press.

As suggested by the previous percentage ranges on densities at completion of the baling and cold compaction operations, the cold harmonic press 24 reduces the thickness of the slab by over one-half from its initial baled dimension. The press, which will be described in greater detail in Section VII, achieves this with pressures of from 7500 to 45,000 or more pounds per square inch at feed rates of the order of 12 bales per hour.

The cold compressed bale 25 is shown on a conveyor 26 being transported to a two-zone furnace shown generally at 27. As it passes along the conveyor 26, it is preheated by exhaust gases emanating from a plenum 28 fed by exhaust gases from the oven through a conduit 29. The preheated bale 25 is fed into a first furnace zone 30 where it is heated from 1000°F. to 1200°F. in an inert atmosphere. The cold compressed bale is thence transported to a second zone 31 where it is heated to form 1200°F. to 2000°F. in a reducing atmosphere. This reducing atmosphere assists in the removal of residual oxides.

The hot cold compressed bale, identified by the numeral 25A is fed along another conveyor 33 under a hood 34 supplied by escaping oven gases. Thus, the hot bale 25A is maintained in the oven atmosphere until condensed to a solid slab. A stack 25 is provided to deliver furnace gases from the hood 34 to the furnace near its inlet or feed end and to the plenum 28 used for preheating the slab.

The hot forming harmonic press is shown at 36. The hot press is used to reduce the bale until it is a solid mass of steel and thereafter to continue the reduction until it has been reduced by about 30 percent from its thickness when it becomes solid. As will be described in greater detail in Section VII, the hot press 36, like the cold press 24, has side restraints of a width equal to the width of the original bale dimension. Accordingly, in compressing the bale until it is a thin solid slab, the thinning results in compaction and elongation, not widening.

In the hot harmonic press, the bale is impacted with sharp, rapid blows. Because of the perimetral confinement of the bale by the platens and the side restraints, and because of the interaction and intertwining of the components of the bale, and because of the inertia of the mass of the bale, the forces imparted to the bale by the harmonic press platens are essentially in planes of compaction. Because the forces are confined essentially to planes of compaction, the forces serve almost exclusively to compress and weld the scrap pieces. With proper confinement and proper combination of temperature and pressure, molecular migration is achieved at abutting surfaces so that a true weld of the components of the bale is achieved and the resultant slab, shown at 38, is a homogeneous piece of solid steel.

If one wishes to form, for example, a rectangular billet rather than a slab, or otherwise reduce the transverse dimension of the work product, a side impacting harmonic press 39 is provided downstream from the press 36. The press 39 is the same as the press 36 with the exception that the impactions are from the sides rather than the top and bottom.

If the ends of the slab 38 require trimming, this can be done with either a flame or an hydraulic shear indicated schematically at 40. The slab then may be delivered to a slab piler 41. Preferably, however, the slab is transported directly and while hot to a mill indicated generally at 42.

The mill 42 is of the planetary type because of the compact nature of it, its relatively low capital investment and —more importantly in the present disclosure—because it can take the slabs 38 while hot and roll them into sheet. This is desirable from the standpoint of inhibiting delamination of the slab which may occur if the preceding manufacturing steps have not been optimally performed in the preferred way or if the scrap is not of appropriate grade and kind.

The planetary mill 42 includes an entry table 44 for feeding the slab 38. A continuous reheating furnace 45 is provided to re-elevate the temperature of the slab to its rolling temperature of up to 2350°F. if it is excessively cooled.

After the slab passes through the oven, it passes through pusher rolls 47 to feed rolls 48. The feed rolls feed the slab into the planetary assemblies 50 which achieve the rolling reduction from slab thickness to strip. The strip will be of the order of less than 1/20th of the original dimension of the bale. The strip passes from the planetaries 50 through pinch rolls 51 across an exit table or conveyor 52 and thence through another pair of pinch rolls 53 to a coiler 54.

II. CLEANING OF THE SCRAP

Figure 4:
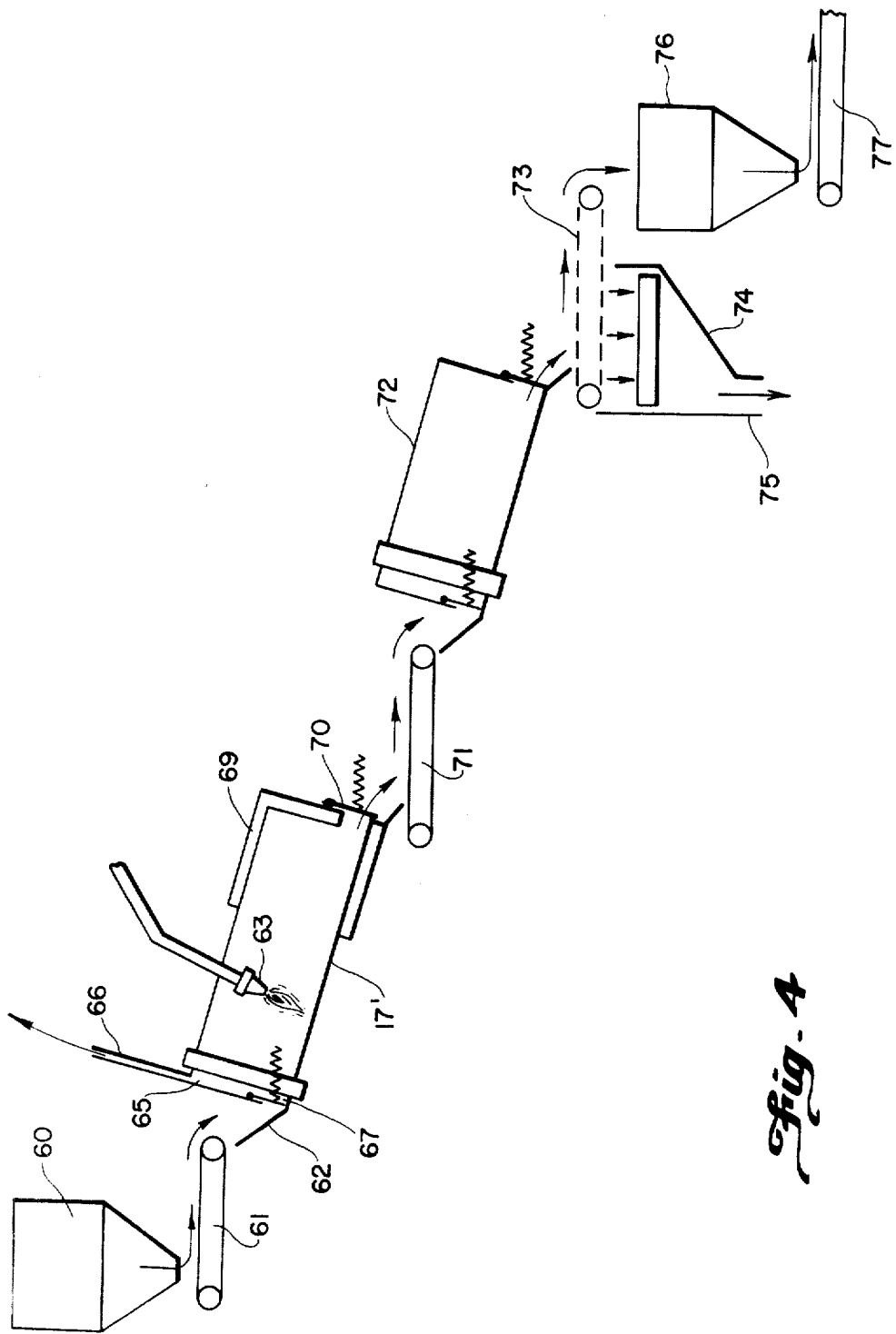
FIG. 4 and FIG. 5 are schematic views of scrap cleaning equipment.

FIG. 4 is a schematic showing of the method of scrap cleaning for the process as described in Section I. A supply hopper 60 is provided. The supply hopper deposits scrap on a scrap supply conveyor 61. The supply conveyor delivers the scrap to a rotary kiln 17'. The kiln has a guide chute 62 which guides the scrap deposited by the conveyor 61 into the kiln.

The kiln 17' includes a rotary retort in which direct flame impingement, depicted by the burner 63 is applied to the pieces of scrap. Oil vapor is collected by a hood 65 and transmitted through a duct 66 to a condenser and recovery system. To keep the kiln closed for efficient recovery of the oil vapors a feed door 67 is provided. The feed door 67 is schematically shown as spring biased to indicate that it opens at the time when scrap is being charged in the kiln and is otherwise closed.

As previously indicated, the scrap is heated in the kiln to from 700° F. to 1000° F. to clean off oil residues and the like. If rusting is present, a reducing atmosphere is used which is composed of a mixture of oxygen and natural gas. The gas mixture is from 45 percent to 55 percent stoichiometric.

After the scrap has been cleaned by the flame impingement, it passes through a water-cooled section 69 and thence through an exit door 70. The scrap, after passing through the exit door 70 is deposited on a transfer conveyor 71. The transfer conveyor 71 transfers the scrap to a mechanical tumbler 72 where the scrap is further cleaned by tumbling. Abrasive shot or grit may be employed in the tumbler 72 to improve the cleaning action.

After tumbling, the scrap is deposited on a second transfer conveyor 73. THe second transfer conveyor is made permeable so that abrasives, if used, will drop through the conveyor into a funnel 74 and thence be delivered through a funnel exit 75 to a collection station.

The cleaned scrap is transmitted by the second transfer conveyor to a collection and baler supply hopper 76. A baler supply conveyor is shown at 77 which transfers clean scrap from the hopper 66 to the baler for baling in the manner described more completely in Section III.

Figure 5:
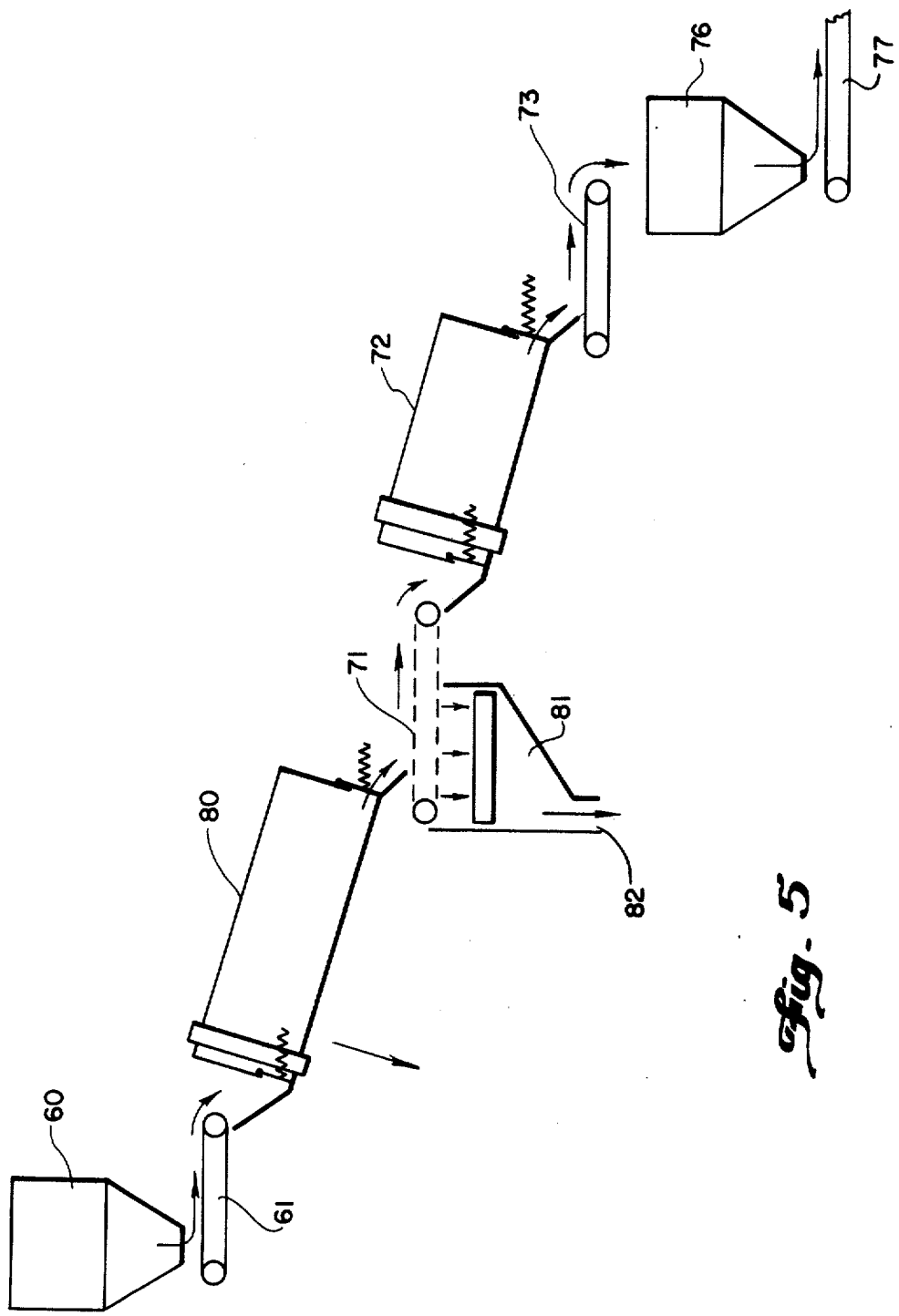

In FIG. 5, an alternate method of scrap cleaning is shown. There the same supply hopper 60 and scrap conveyor 61 are employed. A wash tumbler 80 is provided. The wash tumbler is one in which the scrap is treated with a detergent solution to wash away residues. Here, the first transfer conveyor 71' is porous so that the detergent solution will drop into a collection funnel 81 for delivery through a conduit 82 to a detergent recovery station. The washed scrap is then passed through the tumbler 72 to a second transfer conveyor 73'. As shown in FIG. 5, the second transfer conveyor is not permeable as shot cleaning is normally not required in combination with detergent cleaning.

III. BALING OF THE SCRAP

Figure 6:
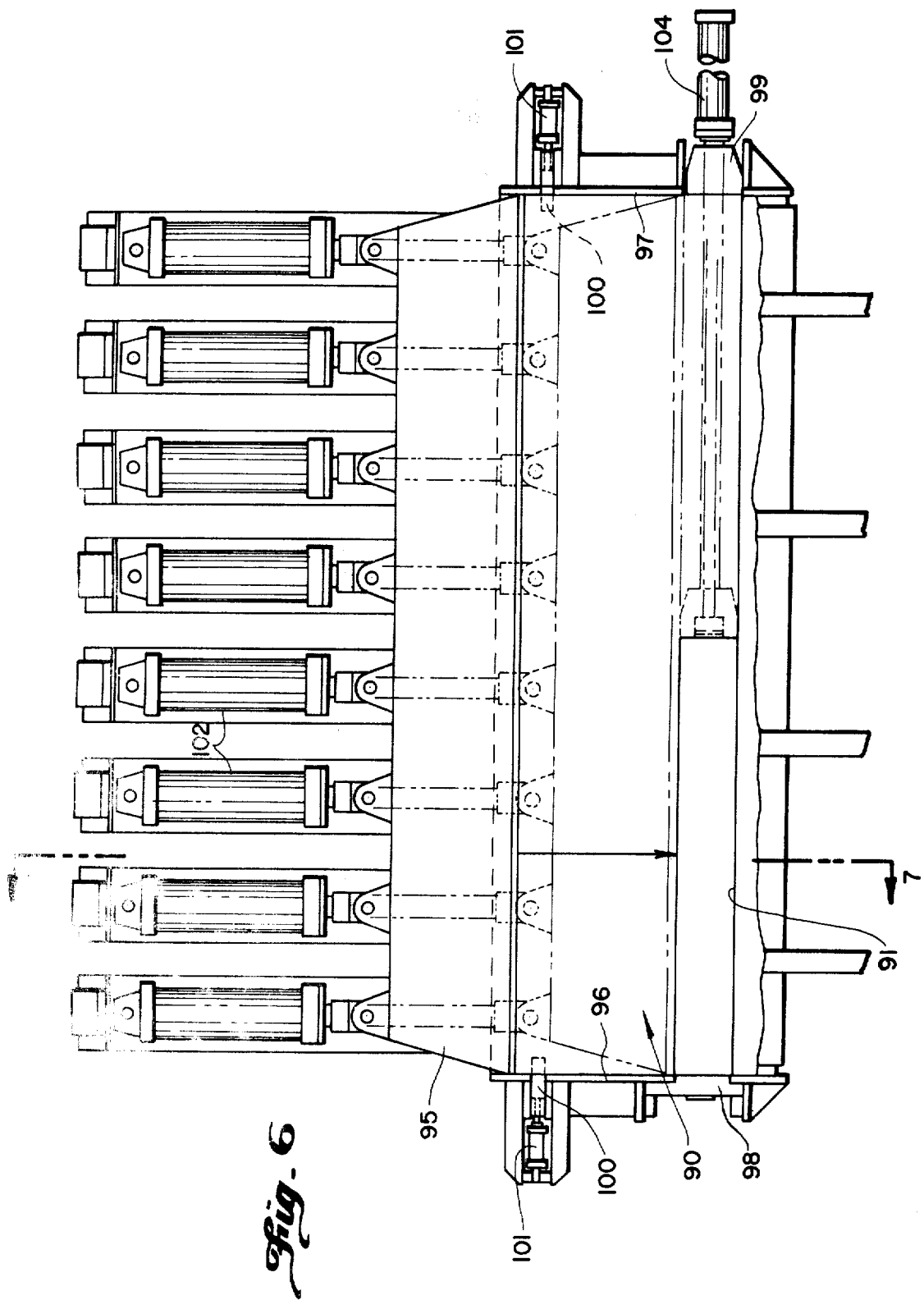
FIG. 6 is a top plan view of a baler.

FIG. 6 is a top plan view of a baler 89. The baler 89 includes a charge space 90 into which scrap is charged when a baler cover 91 is open as shown in FIG. 6. Referring to FIG. 7, the baler cover 91 is shown in its closed position in solid lines and in its open position in phantom. A cover actuator 92 is provided for opening and closing the cover.

The baler charge space 90 is defined, on its bottom and one side, by fixed bottom and side plates 93, 94. These plates 93, 94 extend the length of the charge space 90. The top of the charge space 90 is defined by the cover 91 when it is closed and the other side of the charge space is defined by an elongated, movable, first stage ram 95. The first stage ram 95 extends the length of the charge space 90.

The ends of the charge space are defined in part by a pair of fixed plates 96, 97. The remaining portions of the ends of the charge space 90 are defined by a movable exit door 98 and by a second stage compaction and ejection ram 99.

In operation, the charge space 90 is filled with scrap at a time when the baler cover 91 is open. The cover is then closed. Latches 100 are then positioned to latch the cover in its closed position by energizing cover latch actuators 101. Next, the elongated ram is moved from its solid-line position of FIGS. 6 and 7 to the phantom position shown in FIG. 6. This effects a first stage compaction of the scrap in the charge space 90. This compaction is achieved by simultaneously energizing eight first-stage ram actuators 102.

After the first-stage reduction of the scrap has been accomplished, a compaction and ejection actuator 104 is energized to move the second stage ram 99 from the position shown in solid lines in FIG. 6 to the position shown in phantom. This phantom position is approximately one-half the distance between the fixed plates 96 and 97 so that a 50 percent reduction in bale size is accomplished in the second stage.

After the second stage reduction has been accomplished, the exit door 98 is opened and the bale is ejected by further movement of the second stage and discharge ram 99 from its phantom position to the left toward the exit door to eject the bale from the baler.

IV. BALE CLEANING

Referring now to FIGS. 8 and 9, a bale cleaning apparatus is shwon generally at 120. The bale cleaning apparatus has feed rails 121 across which bales 122 of scrap to be cleaned are fed. The bales are suitably suspended from an overhead chain conveyor indicated by the dotted line 123. Hooks, now shown, suspend the bales for transport through the cleaner.

The bales are fed through an inlet hood 124 into a heated wash sump in the region of the cleaning mechanism indicated by the numeral 125. Cooling coils are provided in a region identified by the numeral 126. The cooling coils serve to condense hot vapors from the heated wash sump and prevent their escape through the inlet hood 124.

After a bale has passed through the heated wash, it is elevated in a vapor treatment region 126 to bring it out of the wash and then transfer it into a hot rinse region 127. After the bale has passed through the hot rinse, it then passes through a vapor rinse region 128, thence to a drying region 129 and it is then prepared for a cold reduction by the press 24.

In FIGS. 8 and 9 a recovery still is indicated generally at 130 where fluids from the bale cleaner 120 are conveyed for distillation and recovery of the cleaning solvents. Supply cleaning and rinsing solvents supply mechanisms are indicated generally at 131. Since these mechanisms 131 are of generally conventional construction, a detailed description of them is not provided here.

V. BALE JOINING

In the formation of finished steel such as steel strip, it is desirable to have as few welds or junctions in the strip as possible. Since the length of a weld-free portion of strip is a function of a size of the slab or billet from which the strip is formed, the larger the slab, the longer will be the weld-free strip.

The baling operation, especially if it is at a location remote from the reduction of the scrap to a homogeneous slab, imposes size limitations on the bales. Since it is desirable to have as large a bale as possible in order to achieve long sections of weld-free strip, it is desirable to join the bales together to form a large workpiece. In FIGS. 10-15, inclusive, alternate methods for achieving the uniting of a plurality of bales are shown.

Figure 10:
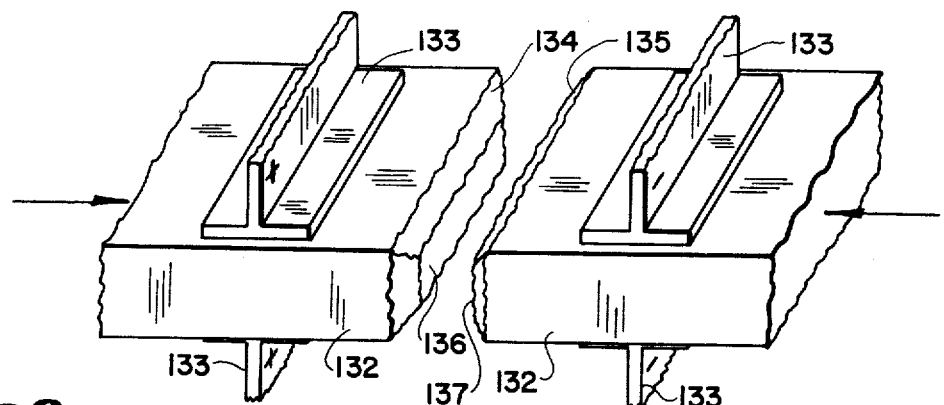
FIG. 10 is a schematic view of a preferred method for connecting together a plurality of smaller bales prior to the forging operation.

The preferred method for joining a plurality of bales is shown in FIG. 10. There a pair of blaes 132 is shown connected to welding electrodes 133. In order to expedite a uniting of the bales 132 together through a welding process, end portions 134, 135 of the bales 132 are formed in the shape of truncated pyramids. This provides end surfaces 136, 137 which respectively are of reduced area is compared with a cross section of the bales. The end surfaces 136, 137 are brought together, and electricity of a voltage of from 20 to 160 volts at 60 cycles and preferably of the order of 80 volts is caused to flow between the electrodes. After the end surfaces 136 and 137 have been heated to a molten state, the bales are upset, that is, forced toward one another to weld the bales together.

The truncated pyramid portions 134, 135 on the bales can be achieved by appropriate configuration of the compression and discharge ram 199 and the exit door 98 of the baler. That is, the ram is formed with a perimetral chamfered portion as is the exit door so that upon compression, the bales take on the end configuration shown in FIG. 10. Alternately, the bales are formed with concave ends so that welding is achieved in a perimetral ring.

Figure 11:
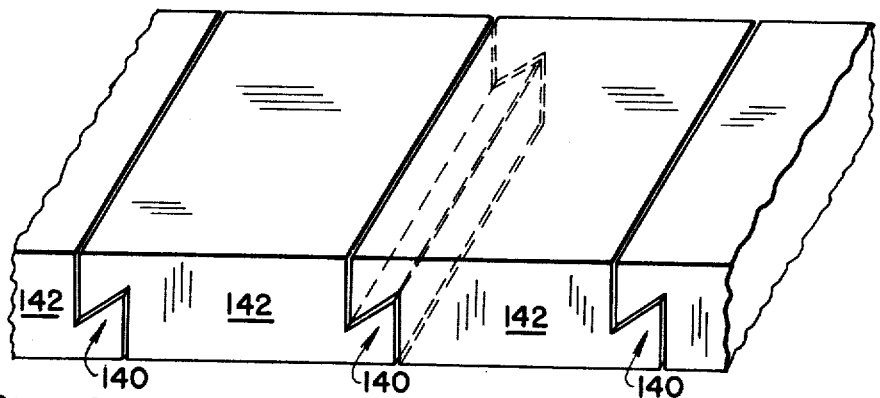
FIGS. 11 and 12 are schematic views of alternate methods of connecting smaller bales together prior to a forging operation.

With the bales of FIG. 11, inserts are provided in the baler so that notched portions indicated at 140 are formed on bales 142. The notched portions are interconnected so that the bales provide the configuration of a long, continuous workpiece. On being fed through the compaction stations as described more completely in Section VII, the notched portions become intimately welded together and the connections of the bale sections disappear.

Figure 12:
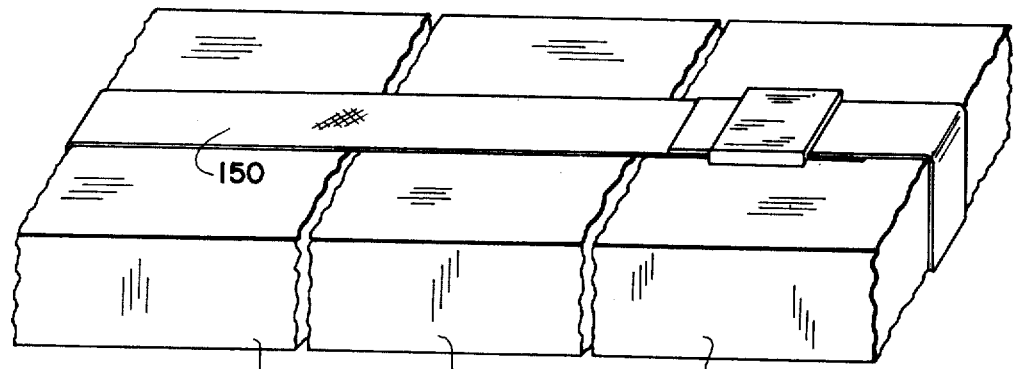

In FIG. 12, a steel band of conventional construction 150 is used to hold together a plurality of bales 152. On passing through the compaction operations, the band and the bales become intimately united into one solid slab of steel.

In FIG. 13, a bale is identified by the numeral 155. Here, the bale has been perimetrally compacted in a baler without end compaction. In short, the bale of FIG. 13 can be produced in the baler of FIGS. 6 and 7 by opening the exit door 98 prior to actuation of the second stage compression and ejection cylinder 104. Thus, the second stage of compression is eliminated, so that ends 156, 157 of the bale 155 are uneven with protruding pieces of scrap.

A substantial equivalent result is achieved with a bale 160 shown in FIG. 14. Here, a finished bale made in the manner described in Section III is placed on a suitable support 161 and impacted with a ram 162. This "explodes" the bale so that the ends 163, 164 lose their regular and smooth configuration and pieces of scrap project therefrom as indicated in FIG. 14.

Figure 15A:
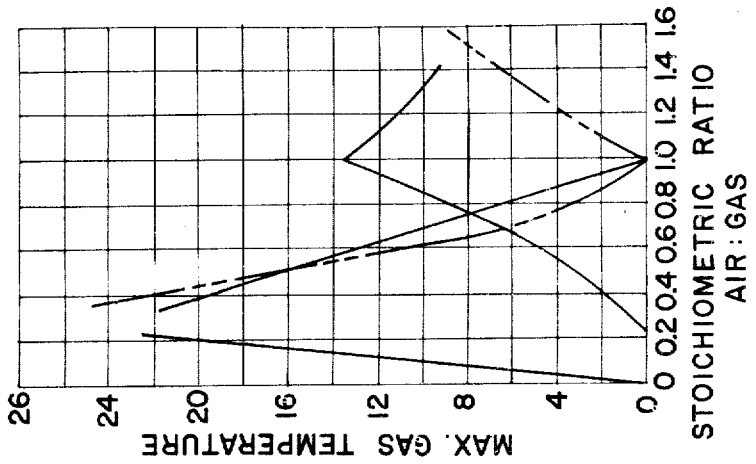
FIG. 15A is a graphic representation of the variation of gaseous combustion elements with variation of stoichiometric ratios of natural gas $CH_4$ and air.
Figure 15B:
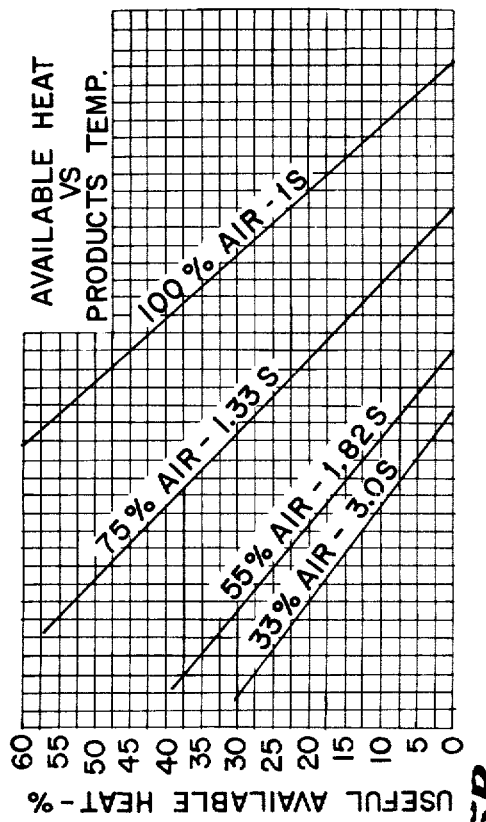
FIG. 15B is a graphic representation of the variation of maximum gaseous atmosphere temperature resulting from burning various stoichiometric ratios of natural gas and air.
Figure 15C:
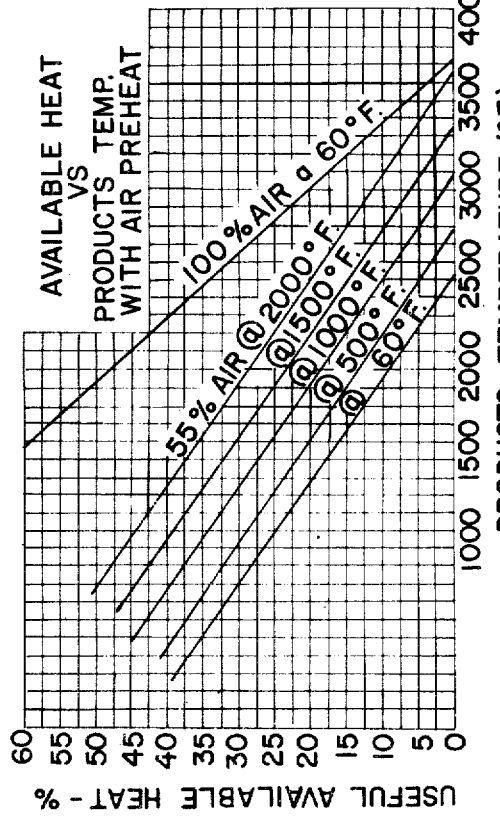
FIG. 15C is a graphic representation of the variation of available heat from combustion of natural gas and cold air with the resulting variation of product temperature in such atmosphere

The bales 155 or 160 are placed on a feed conveyor 165 shown in FIG. 15. The feed conveyor discharges the bales into a cavity 166 in a large perimetral die 167. A movable bottom door 168 is positioned to hold the bales when they are charged into the cavity 166. After the cavity 166 has been filled with bales 155 or 160, a ram 170 compresses them longitudinally so that the ragged ends of the bales are forced into tight interconnecting engagement with one another and the series of bales are joined together in a larger workpiece indicated by phantom lines at 171. As the drawing will suggest, the door 168 is open and the joined bales forming the workpiece 171 are gravity fed to a conveyor 172 which transports the workpiece to the cold compaction station of Section VII.

VI. BALE HEATING

To achieve bonding between scrap or metallic elements of a bale, within commercial practicality, thermal energy must be imparted to the bale so that it attains a temperature in the range of 1400°F. to 2350°F. Exactly what terminal temperature is selected depends upon the designed strain rate and distributed pressures used in the hot compaction as discussed more fully in Section VII.

In the present method, the furnace is divided into two or three zones. In a first zone of the two-zone version, the scrap bale is heated to about 1000° F. to 1200° F. A second stage of heating is then carried out in a second zone having a reducing atmosphere of natural gas and air. Here, the supply air is preheated to raise the atmosphere temperature to the desired level while achieving the desired reducing atmosphere.

Referring now to FIG. 16, a two-zone furnace is shown generally at 175. The furnace has a first zone 176 in which the temperature of the bales is elevated to a temperature of from 1000° F. to 1200° F., preferably in an oxidizing atmosphere. The bales pass from the first zone to a second zone 177 where a positive pressure of reducing gas is maintained and the temperature of the bales is elevated from 1200° F. to 2000° F. or as high as 2350° F.

A bale 179 is fed from the left, as viewed in FIG. 16, through an entrance door 180 into the first zone 176. There, fans 181 (as best illustrated in FIG. 19) are provided to circulate furnace gases. Thus, the slab heating in the first zone is indirect heating through the circulation of the furnace gases. Heat for the circulating furnace gases is supplied through the radiant tubes 182. A mixture of natural gas and combustion air is circulated through these radiant tubes 182 to heat them to the desired temperatures and the circulating gases around the tubes transfer the heat to the bales 179.

Figure 17:
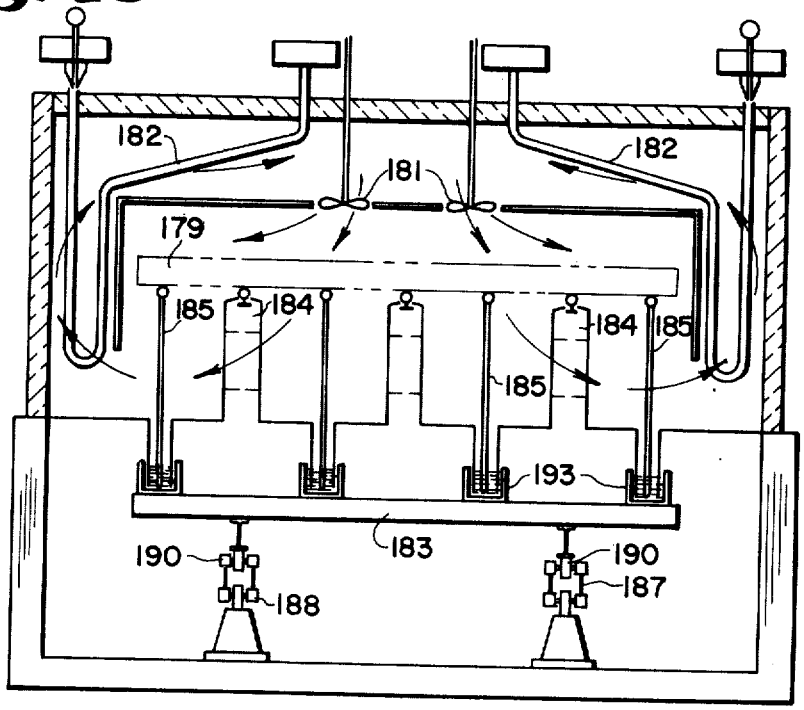

The bales are transported through the furnace by a walking beam. This beam has, referring to FIG. 17, a base platform 183. This platform is periodically elevated so that walking beam elevators 184 lift the bale 179 off fixed stanchions 185. When the bale is so elevated, the platform 183 and the elevators 184 are caused to move longitudinally of the furnace in a manner which will be described presently. The platform 183 and its elevators 184 are then lowered to deposit the bale 179 on the fixed stanchions 185. The platform and elevators are then reciprocated in the opposite direction while below and out of contact with the bales and the cycle is repeated to sequentially move the bale longitudinally through the furnace.

Figure 20:
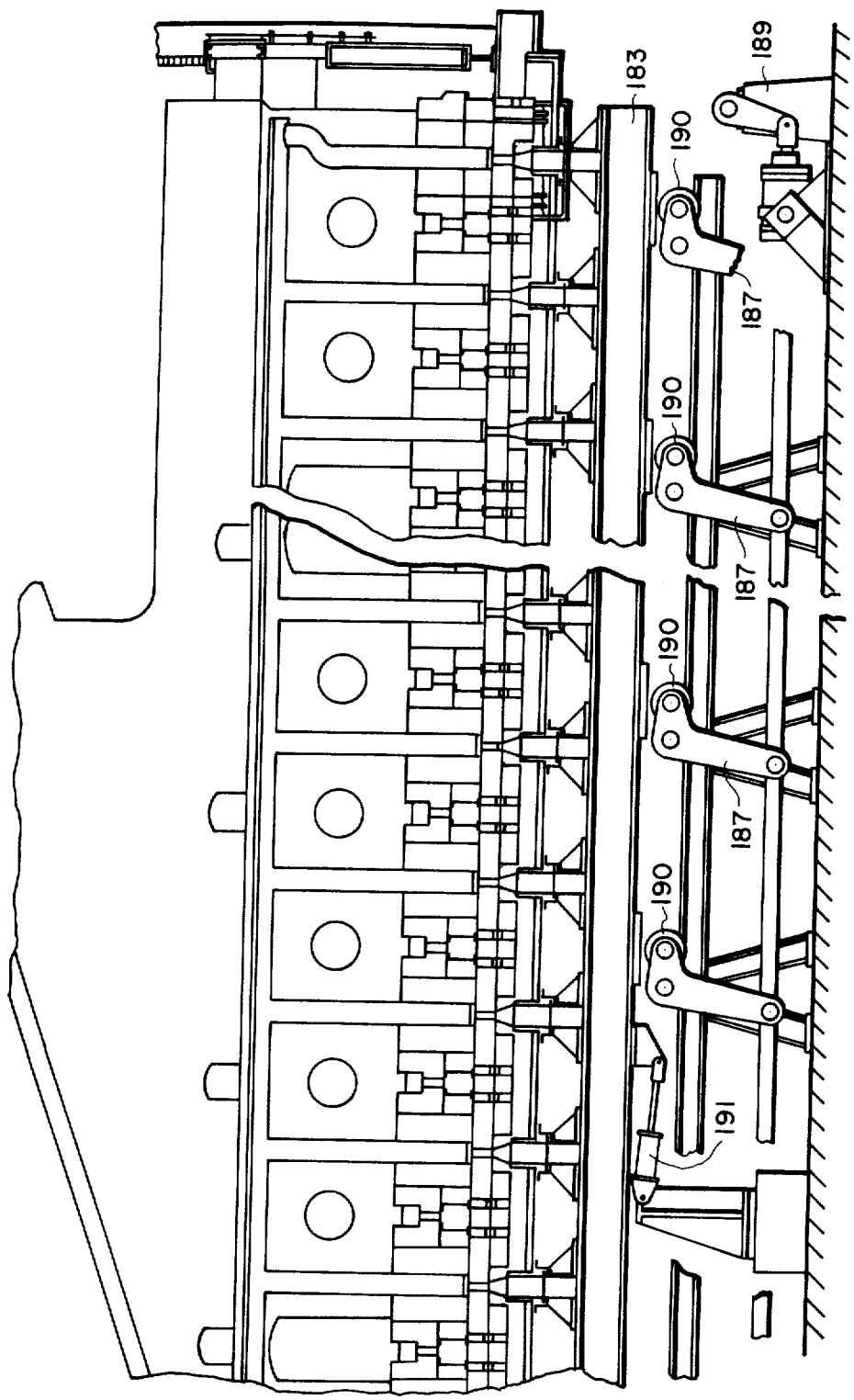
FIG. 20 is an enlarged sectional view showing the walking beam employed in this invention to transport bales through the furnace.

Referring now to FIG. 20, the mechanism for elevating the platform 183 and the elevators 184 is shown. A plurality of elevator levers 187 are pivotally mounted below the platform 183. An acutating rod 188 is pivotally connected to each of the elevators levels 187. When an actuator 189 is energized, it moves the actuating rod 188, causing the levers 187 to pivot. Rollers 190 on the levers then act against the platform 183 to lift it. This elevates the bales above the stanchions 184.

A bale advance cylinder 191 is then energized to shift the entire platform 183 and the supported bales longitudinally while supported on the rollers 190. The elevator actuator 189 is then operated in the opposite direction to lower the walking beam until the bales are supported on the stanchions 185. The beam cylinder 191 then operates in the other direction to shift the platform 183 to the left as seen in FIG. 20 and the cycle is complete.

Figure 18:
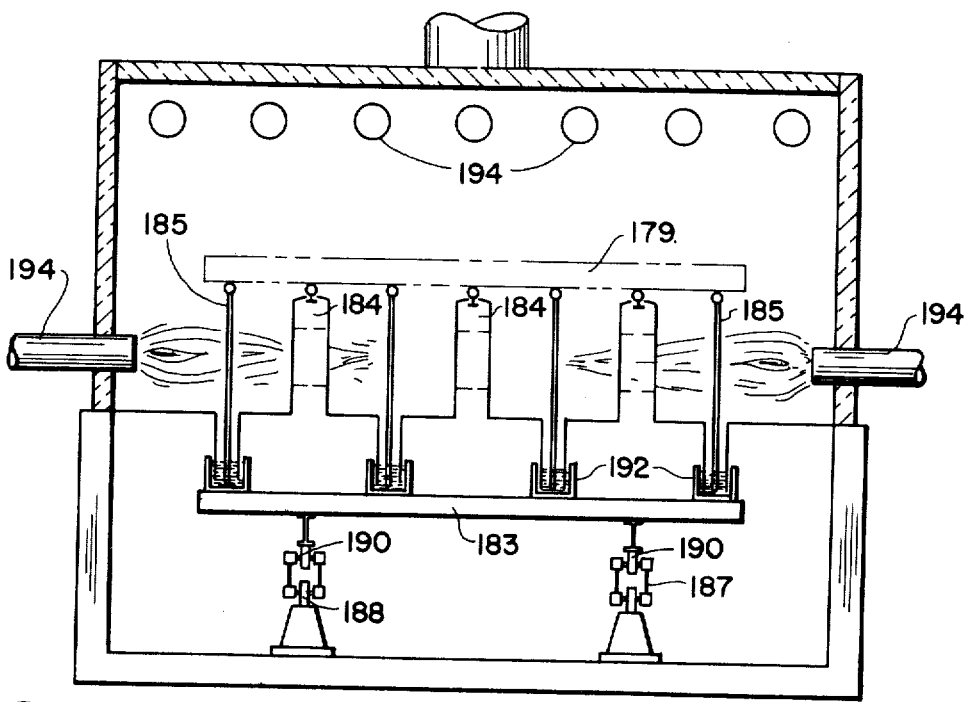
FIGS. 17 and 18 are sectional views of the furnace of FIG. 16 as seen respectively from the planes indicated by lines 17—17 and 18—18 of FIG. 16.

Elongated troughs 192 are provided as shown in FIG. 18. These troughs are each partially filled with liquid lead. The troughs 192 are mounted on the platform 183 and move up and down longitudinally with it. The stanchions 185 have depending skirts which extend into these troughs so that an effective gas seal is achieved as the walking beam is actuated.

After a slab 179 has passed through the first zone 176, a zone division door 193, best illustrated in FIG. 16, is opened and the bale is transported into the second zone. Here, heating is accomplished by flame impingement with flames emitted from burners 194. These burners direct the flame both from the sides and from the top to achieve the high heats desired. Air supplied to the burners 194 is preheated, in a manner not shown, by exhaust gases from either zone. After the slab has been heated in the second zone 177, it passes through an exit door 195.

Exhaust gases are extracted through a stack 196. The stack has two outlets, one of which, 197, directs gases to the hood 34 while the other, 198, can exhaust excessive gases. In addition, suitable ducting, not shown, can be provided for the preheat described in Section I.

Like the walking beam, the doors are sealed by liquid mercury or melted lead to maintain the gas-tight integrity of the furnace gases. The seal of the exit door 195 is illustrative and shown on an enlarged scale in FIG. 21. There troughs 199 are shown. These troughs extend transversely across the door opening. They carry melted lead or mercury into which a lower portion of the door and an upper lip 195A project when the door is closed to effect a seal. The lower trough is connected to the walking beam so that the ends of the door remain sealed when the slabs are moved.

VII. BALE COMPACTION

Figure 22:
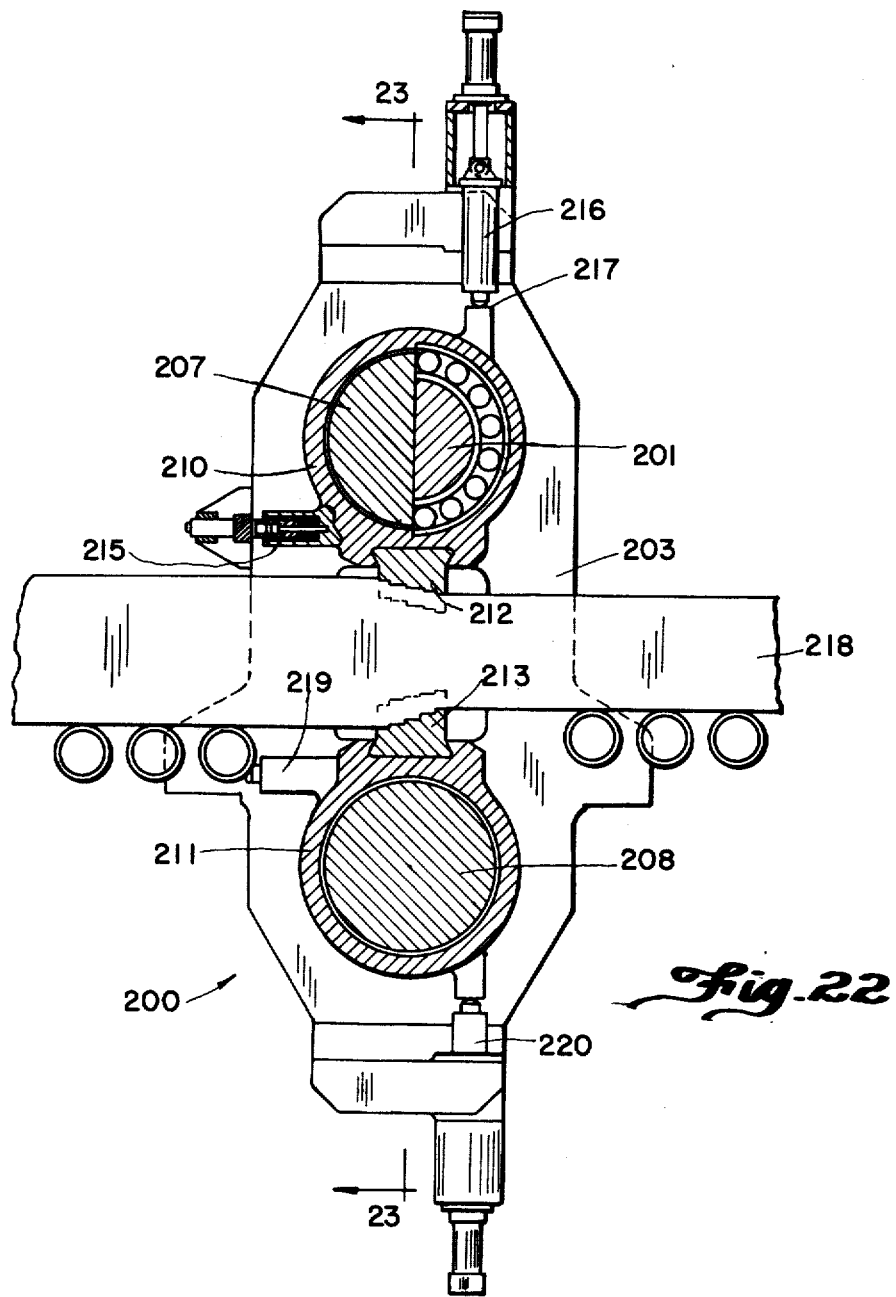
FIG. 22 is a sectional view of the harmonic press utilized in this invention.
Figure 23:
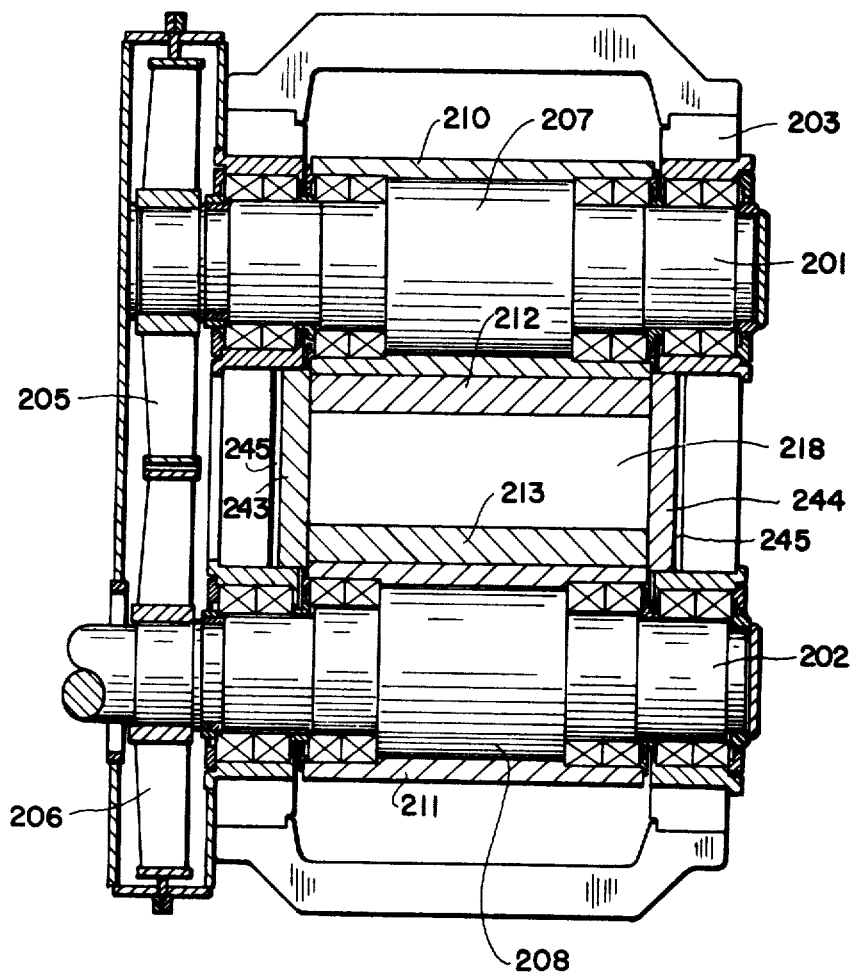
FIG. 23 is a sectional view of the harmonic press of this invention as seen from the plane indicated by the line 23—23 of FIG. 22.

FIG. 22 is a vertical sectional view of a harmonic press 200. The press as shown in FIG. 22 is essentially a prior art press. FIG. 23 is a sectional view of the press of FIG. 22, but modified from the prior art in respects that will be described. FIGS. 24–27 show further advances over the press of FIG. 22 to produce the cold and hot compaction harmonic presses 24, 26.

Referring to FIGS. 22 and 23, a pair of eccentric shafts 201, 202 are journaled in a frame 203. Gears 205, 206 are connected to the shafts 201, 202, respectively, to drive them in synchronized and opposite rotation. Suitable drive gearing, not shown, is coupled to the gears 205, 206 to cause this synchronized and opposite rotation.

The shafts 201, 202 have eccentric central portions 207, 208 respectively. These eccentric portions are each cylindrically contoured and each has an axis whoch is offset from the axis of its shaft so that on rotation of the shaft, the axis of the eccentric portion orbits about its shaft axis. A pair of platen supports 210, 211 are journaled on the eccentrics 207, 208, respectively. Platens 212, 213 are carried by the platen supports 210, 211 respectively.

Referring now to the upper eccentric shaft 201, the platen support 210 carries a snubber assembly 215 which inhibits rotation of the platen support 210 in a clockwise direction with respect to the eccentric 217. The frame carries a counterclockwise snubber assembly 216 which acts against a flat 217 on the platen support 210 to inhibit counterclockwise rotation of the platen.

As a workpiece 218 advances from the left to the right as viewed in FIG. 22, leading portions of the platens 212, 213 strike the workpiece first. This initial striking causes the upper platen to rotate relative to its eccentric 207 in a counterclockwise direction against the action of the snubber assembly 216. Concurrently the lower platen support 211 tends to rotate in a clockwise direction relative to its eccentric 208 against the action of a corresponding snubber assembly 219. This platen support rotation imposes stresses on the machine because of unbalanced reaction forces which occur when the entire work surfaces of the platens 212 and 213 are not striking the workpiece. Once the workpiece is fed to a position such that the entire work surface of the platens 212, 213 is impacting the workpiece, as shown in FIG. 22, the stresses become balanced.

As the workpiece leaves the impacting region below the platens, only trailing portions of the work surfaces of the platens 212 and 213 are striking the workpiece and, accordingly, the platen supports tend to rotate in directions opposite from that when the workpiece commences to feed between the platens. That is, the upper platen support 210 tends to rotate in a counterclockwise direction against the action of the snubber 216 while the lower platen support 211 tends to rotate in a clockwise direction against the action of a corresponding snubber assembly 220.

From this description of the machine shown in FIGS. 22 and 23, it will be seen that a limiting factor on the capacity of the machine is the stresses imposed as the workpiece 218 enters and leaves a forging region. Moreover, the forging pressures imposed as the workpiece enters and leaves the forging region are not reliably consistent for the limiting factors on these forces are the spring resistances of the snubber assemblies. In addition, the platens of this prior art device are designed to work at relatively low strain rates resulting from reciprocating speeds less than 4 cycles per second. Accordingly, the platens were designed with vertically disposed serrations (staircase style) throughout the entire platen surface with no attention to accommodating smooth indexing of the workpiece past the platens necessitated by higher strain rates.

Figure 24:
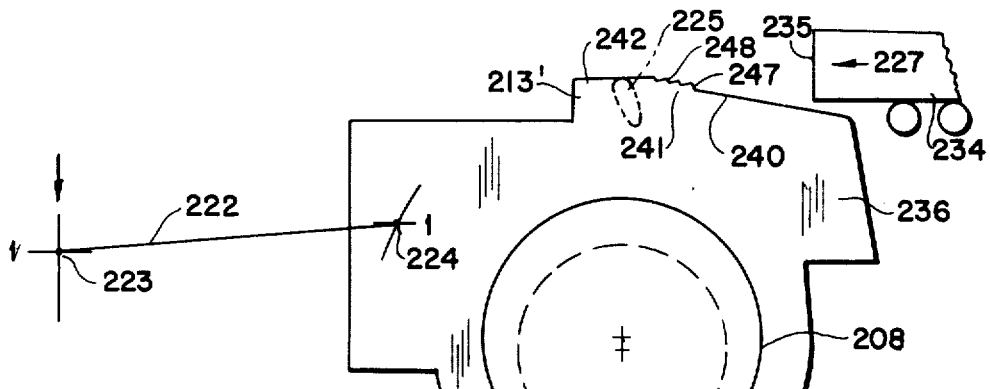
FIGS. 24–26 are somewhat schematic and diagrammatic views of a platen of this invention showing the various platen motions which can be achieved according to adjustment of the contraining means.
Figure 25:
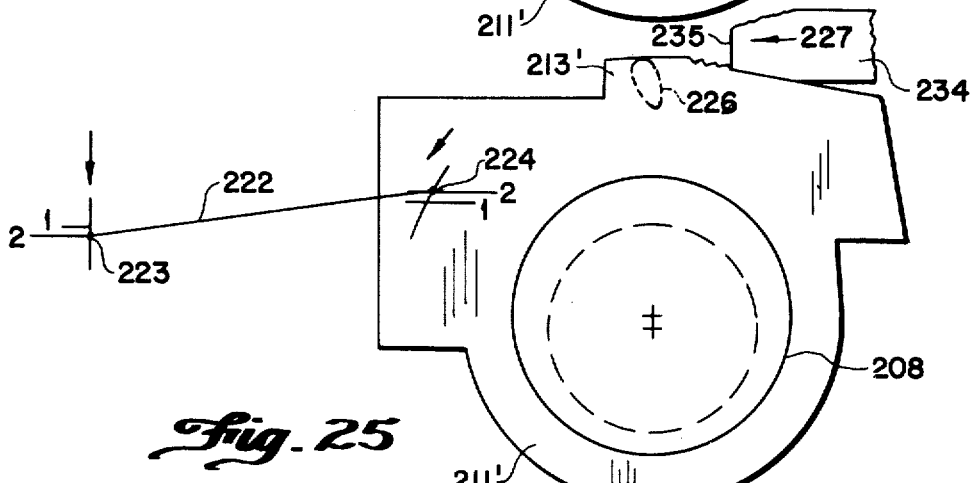
Figure 26:
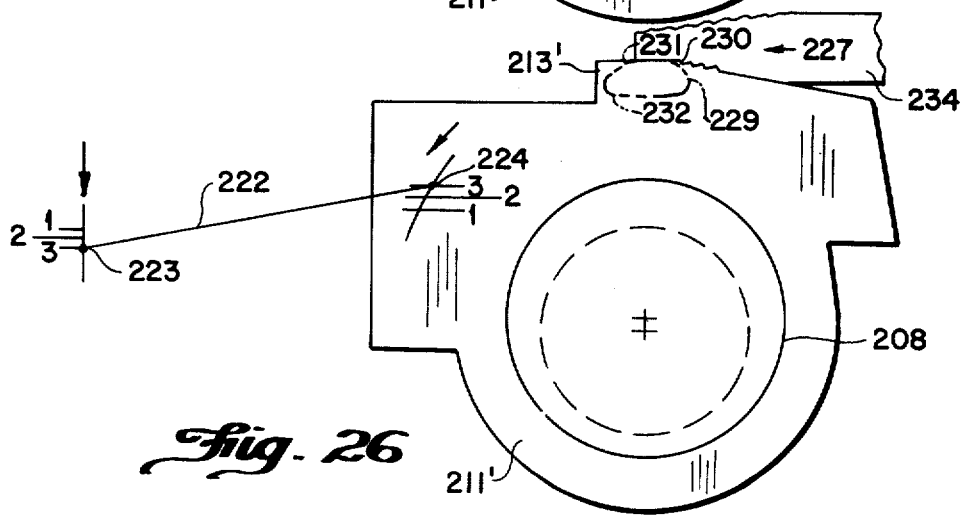

One of the outstanding features of the invention is in the provision of adjustable control and restraint of the platens so that the impacting action of the platens is optimized for the workpiece feed conditions at any given time. Referring to FIGS. 24–26, schematic diagrams of the novel and improved platen construction of this invention are shown. In FIGS. 24–27, numerals corresponding to those used to describe FIGS. 22 and 23 have been used. Where the part has been modified to produce advantages of this invention, a prime is added to the numeral. Thus, the lower eccentric shaft 202 and its eccentric 208 are not modified while the platen support is identified as 211'.

Referring to FIG. 24, a restraining rod is shown schematically at 222. The restraining rod 222 is pivotally connected to the frame of the press at 223 and to the platen support 211' at 224. This latter connection to the platen support connects the restraining rod to the platen 213' to control the movement of the platen during a forging operation. With the pivots 223, 224 in the positions indicated by the numerals 1 in FIGS. 24–26, movement of the platen is constricted to a generally elliptical pattern indicated by the dashed lines at 225, FIG. 24. By movement of either or both of the pivots 223, 224, one is able to vary the motion transcribed by any given point on the plate 213 to adjust the forging action. Thus, if the pivot point 223 is moved downwardly, as viewed in FIGS. 24–26, to the position indicated at 2 and the pivot 224 upwardly to the position indicated at 2, the path transcribed by a point on the platen assumes the shape shown at 226 in FIG. 25.

In the adjusted position of the rod 222 shown in FIG. 24, the motion of a given point on the platen approaches reciprocation with respect to a workpiece traveling from left to right horizontally across the page, as indicated by the arrow 227. It is transcribing, as indicated, an elliptical path 225 which has a major axis transverse to the workpiece path 227. The adjustments can be modified until that major axis is essentially perpendicular to the path 227. Adjustment from the 1 position to the 2 position as shown in FIG. 25 increases the component of platen travel paralleling the workpiece path materially. By moving the constraining rod pivots 223 and 224 further downwardly and upwardly respectively to the positions shown at 3 in FIG. 26, the travel of a point on the platen is modified to the path indicated by the dashed line 229.

In the adjustment position of FIG. 26, any given point on the platen is traversing a path which is generally in the shape of an ellipse having its major axis paralleling the workpiece path 227. The fact that the path 229 is not a true ellipse but rather somewhat in the shape of an airfoil produces further improved results.

More specifically, in an approach segment of the path 229, identified by the curved line 230, the platen has a relatively large moment of travel toward the workpiece path. This maximizes forces imposed on the workpiece in impacting compressive motion. As the platen completes the traversing of the approach segment 230 of the path 229, its travel becomes momentarily totally parallel to that of the workpiece path and then it gradually retracts in a retract segment 231 of the travel. This maintains platen-to-workpiece engagement as long as possible and imparts a substantial self feed moment of force to the workpiece along the path 227 after the impaction has been achieved. In a final or return segment 232, of the path 229, the motion of the platen is almost parallel to the path 227 and in an opposite direction so that return time to the approach and retract and feed segments 230, 231 of the path is minimized.

As a workpiece bale 234 is fed from right to left as viewed in FIGS. 24–26, the restraining rod 222 is first positioned in the 1 positions of FIG. 24. A lead edge 235 of the workpiece 234 may first strike a bullhorn 236. The bullhorn is designed to funnel any diverging pieces of scrap in the workpiece bale 234 into the forging area to prevent these diverging pieces from becoming hung up or jammed as the workpiece 234 is fed into the press. The feed is continued until the workpiece 234 is engaged by a lead initial engagement portion 240 of a work surface of the platen 213'. As the leading edge 2345 of the workpiece commenced to engage a central serrated and feed portion 241 of the anvil 213', the constraining rod 222 is adjusted to the position of FIG. 25. Once the workpiece 234 has been fed sufficiently along the path 227 that the forced imposed on the press are reasonably uniformly distributed by full or substantially full surface contact with the workpiece 237, the constraining rod 222 is moved to the 3 positions of FIG. 26 for the forging and self-feed action.

As the feed continues, until a trailing edge—not shown—is engaged only by a trailing end smoothing portion 242, the restraining rod 222 is adjusted in the opposite direction until it is in the 1 positions of FIG. 24 to again minimize the reaction stresses on the press. Thus, by changing the positioning of the restraining rod, one is able to vary the reaction forces imposed on the press to maximize impaction at any one time.

In addition to the novel platen construction and adjustable constraint imposed on the platen, the press of this invention has another novel feature shown only in FIG. 23. Thus, as indicated above, FIG. 23, unlike FIG. 22, shows a feature which is not in the prior art. More specifically, fixed side restraints 243, 244 are provided which are juxtaposed substantially against the platens. These side restraints are spaced a distance equal to the width of the bale prior to impaction. They preferably have a flared out lead portion as indicated at 245 in FIG. 23 to funnel any projecting portions of a workpiece into the forging area. Alternately, the side restraints may be made movable to move in synchronization with the platens thus facilitating feed through the press.

Since the press uses fixed side restraints 243 of a width equal to the width of the workpiece 227 (or side restraints which are at an inward position at the time of impact) the workpiece is perimetrally restrained as it is impacted. Thus, lateral dissipation of the impaction forces is inhibited and good, full fill-out in a lateral direction is assured. Since the scrap pieces are baled and become mechanically intertwined in the baling operation, longitudinal dissipation of the impaction forces is resisted. In addition, by operation of the platens in the novel, described manner so that the approach segment 230 of the travel 229 is rapid achieving velocities in a range of from 4 to 30 revolutions per second and higher, the inertia of rest of components of the bale further resist longitudinal dissipation of the impaction forces. Thus, the impaction forces are confined essentially to planes of impaction transverse to the workpiece area and migration of molecules in the scrap pieces is caused, resulting in a full and firm welding and uniting of the scrap pieces into a homogeneous slab.

Several of the outstanding features of the invention are obtained due to the impactions being so sharp and sudden. These include (1) the described inhibition of lateral force dissipation, (2) the localization of force application and (3) tests indicate that dirt pieces actually fracture and disperse.

As to localization of force application increased strain rate applied uniformly has led to the most significant improvements. The available mechanical energy is put to its maximum use by an increase in strain rate in that plastic flow of the scrap pieces is inhibited and localized surface bonding is incouraged substantially within the plane of impaction. At greatly increased strain rates, the temperature of the scrap at which compaction takes place can be lowered. This invention views the bonding of metallic scrap as a total energy concept comprised of thermal, mechanical and shock characteristics.

With sharp impactions the forces are initially absorbed in a relatively thin portion near the surface of the workpiece. As this portion reaches a solid condition continued impact results in forces being transmitted by the surface portion to the portions toward the center. Thus, the force application is highly concentrated resulting in good, intimate welding. Since dirt is dispersed, clean scrap is not required except for total optimization of the control of the quality of the finished product. Very satisfactory steel strip has been made on an experimental basis with the process and apparatus of this invention when dirt particles have been present.

As can be seen best in FIGS. 24–26, the work surfaces of the anvil 213' are, in the planes of cross section of those drawings, generally convex with respect to the workpiece. In addition, they are straight in a plane of cross section perpendicular to the workpiece path. To achieve the desired compaction of from the order of 30 percent to 90 percent solid to a thickness of 30 percent less than the thickness when the bale is first impacted to a solid condition, the platen has this novel configuration which has been shown and described.

The lead and initial engagement portion 240 reduces the size of the bale adequately for the serrated and feed portion to effect its action. It is when the bale is between the serrated and feed portions 241 that the true compression and welding is primarily achieved.

The serrated portions are configured so that each leading surface 247 of a serration is generally parallel to what is known as slip planes in the workpiece. Each leading surface 247 is canted from 15° to 45° with a perpendicular to the workpiece path. Impact surfaces 248 on the serrations are substantially normal to the leading surfaces 247 and thence from 15° to 45° from parallel with the workpiece path 227.

As a serration impacts a workpiece, it tends to push the bale in a path that has a feed moment as well as a compressive moment. This is in a path generally paralleling what, as indicated is known as a slip plane. In other words, pieces of the bale tend to slip relative to one another along planes which have a component toward the outlet end of the forging press. By imposing the impaction forces substantially along these planes, the dissipation of the forces is further inhibited and true welding is achieved under the appropriate conditions of temperature and confinement.

The self-feed action achieved with the novel platens and platen restraint is an important factor in the success of the invention. It overcomes severe feed problems which are present with prior art presses. If bale feed is performed with feed rolls there is a tendency for the rolls, if ahead of forging, to pull the scrap loose and if after forging to detract from the resistance to longitudinal force dissipation. Push rods have been tried but these tend to buckle the bale. Hence, the disclosed construction overcomes these problems in addition to optimizing compaction forces.

Figure 27:
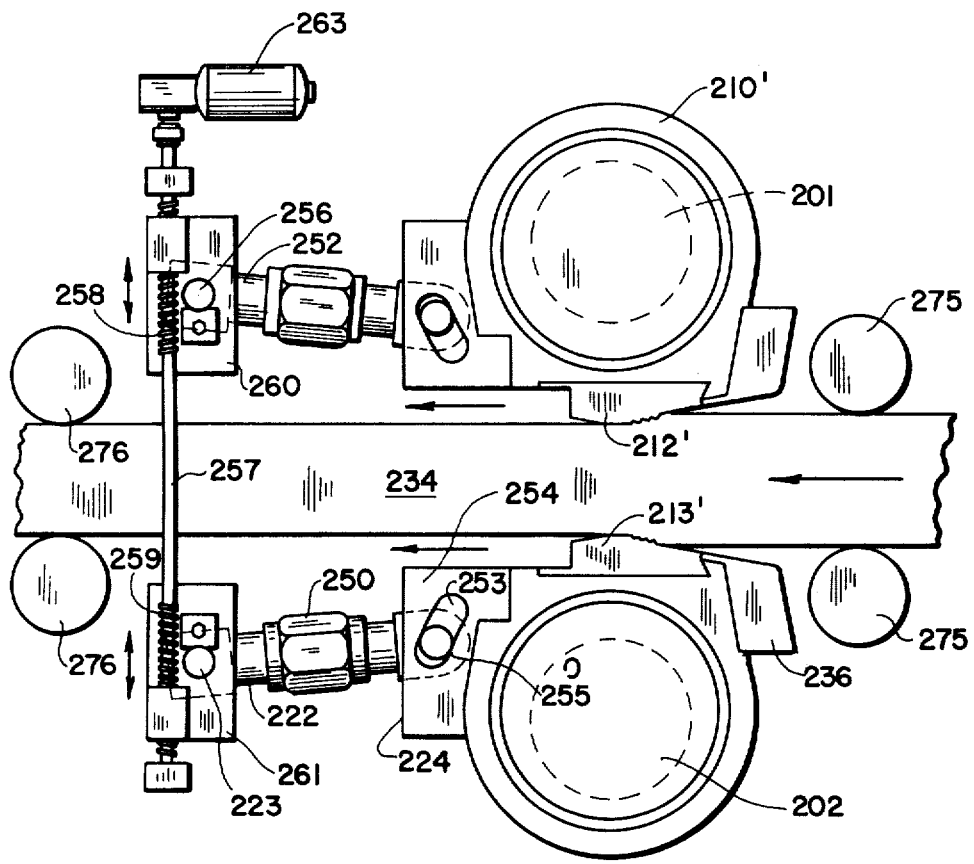
FIG. 27 is a schematic sectional view of the harmonic press of this invention showing in greater detail the adjustment means and the method of adjusting it.

Referring now to FIG. 27, the structure for accomplishing the adjustments described in connection with schematic drawings of FIGS. 24–26 is shown. Since the upper platen is the mirror image of the lower, the previously described construction with respect to the lower platen will not be repeated.

The arm 222 includes an adjustment nut 250 for varying the length of the arm. As shown, this may be a manual adjustment. Obviously, servo motors may be mounted on the adjustment nut 250 and a corresponding adjustment nut 251 on corresponding upper restraining arm 252 to effect a remote control and automatic adjustment.

The pivot 224 rides in a curved slot, 253 in a platen attachment block 254. The pivot 224 may be secured in any suitable manner in an adjusted position such as by nut 255. Alternately, servo motors, or other remotely controllable mechanisms, can be used to adjust the arm-to-platen pivots.

The adjustment of the frame-to-arm pivot 223 and a corresponding upper pivot 256 is shown as controlled by a lead screw 257. The lead screw 257 has worm portions 258, 259 which threadably engage upper and lower adjustment blocks 260, 261. These adjustment blocks are suitably guided in the frame and move up and down to achieve the adjustment of the pivots 223, 256. The lead screw 257 is rotationally driven by motor 263 to provide synchronous adjustment of the pivots 223, 256. Feed pinch rolls are shown at 275 which feed the workpiece to the press. Delivery pinch rolls 276 are provided for removing a finished workpiece.

VIII. SLAB ROLLING

Referring again to FIG. 3, there is a diagrammatic showing of a planetary rolling mill. As indicated previously, the slab 38 is fed through the furnace 45 where it is reheated to an appropriate temperature which is of the order of 1200° F. to 2350° F. After reheating and descaling in the descaler 46, the feed rolls 48 feed the slab into the planetary 50 where reduction to strip is achieved.

The planetary 50 has a central, cylindrical, backing beam 285. A cluster of intermediate rolls 286 are around the backing beam and surrounded by a cluster of planetary rolls 287. The planetary rolls 287 orbit the backing beam 285 at high speed. Referring to the upper roll cluster above the workpiece as shown in FIG. 3, the orbiting is in a counterclockwise direction. Each roll 287 rotates about its own axis in a clockwise direction so that a compression and rolling smoothing action is achieved by the mill. The particular mill depicted and described is available commercially under the designation Krupp/Platzer Planetary Rolling Mill and is made by Fried. Krupp GmbH Endustriebau, Essen, Germany.

When the strip passes out of the planetary 50, it will be of the order of $x$ 0.07 inch thickness and be no more than 1/20th of the thickness of the slab being fed. With this great compression and reduction, any slight defects which may have existed in the slab being fed after it has been impacted in the hot harmonic press 36 will disappear and good quality strip, quite usable for automotive and other purposes, is produced by the process.

Figure 27A:
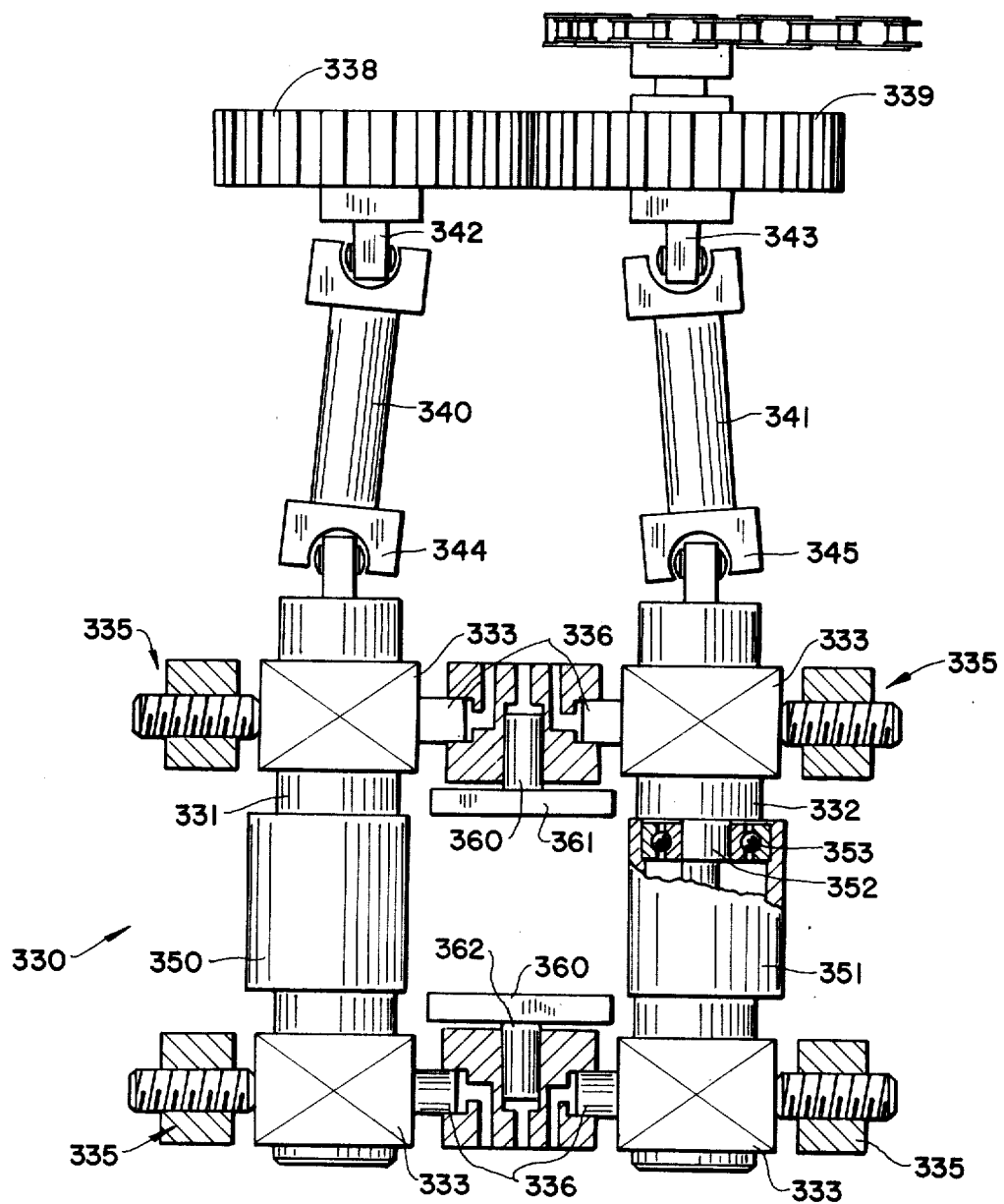
FIG. 27A is a diagrammatic sectional view of a novel mill for finishing steel slabs.

Referring to FIG. 27A, an adjustable mill is shown at 330. This mill, or a plurality of them in series achieve the function of the planetary mill of FIG. 3 in a novel and improved manner. A pair of eccentric shafts 331, 332 are journaled at opposite ends by suitable heavy-duty bearing blocks shown schematically at 333. The relative position of the eccentric shafts 331, 332 is adjustable by means of threaded adjustment members shown generally at 335. Hydraulically actuated members shown generally at 336 maintain the beam blocks 333 against the adjustment members 335. The side restraints 360, 361 are provided and are also adjustable by means of hydraulic actuated members shown generally at 362.

The eccentric shafts 331, 332 are driven by gears 338, 339 through connecting shafts 340, 341, respectively, in synchronized and opposite rotation. Universal joints 342, 343 connect one end of the connecting shafts 340, 341 to the gears 338, 339 while universal joints 344, 345 connect the opposite ends of the connecting shafts to the eccentric shafts 331, 332. By this arrangement, the eccentric shafts 331, 332 may be moved relative to each other while being rotated by the gears.

The advantage of such an adjustable mill lies in the fact that total reduction of a hot slab, from about 7 inches average thickness to about 1 inch, may take place in one location obviating the need for multiple roughing stands. The solid being worked is moved through the press incrementally allowing for progressively larger reductions in thickness.

The reduction is accomplished with rollers 350, 351 which are respectively mounted on eccentric portions of the eccentric shafts 331, 332. The eccentric portion of the eccentric shaft 332 is shown at 353. The roll 351 is journaled on the eccentric portion 352 by a bearing 353. Alternately, the rolls 350, 351 may be fixed on the eccentrics to achieve a burnishing-like finishing action.

IX. POWDER APPLICATION

Figures 28, 29:
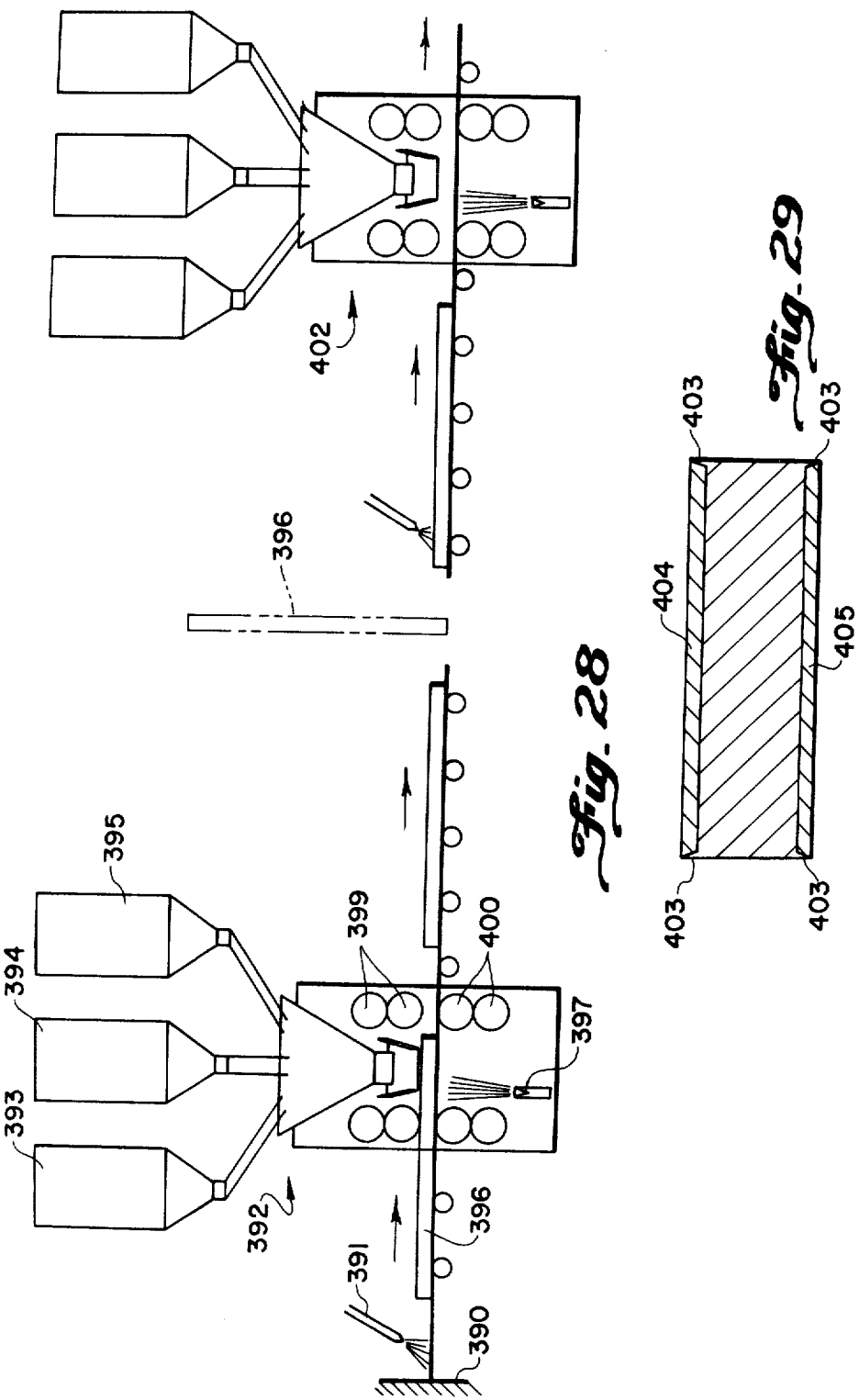
FIG. 28 is a schematic view of a method and apparatus of producing a thin layer of steel from powder on surfaces of a slab.
FIG. 29 is an enlarged sectional view showing a cross-sectional view of the finished slab produced by the structure shown in FIG. 28; and, FIG. 30 is a schematic view of a mechanism for producing steel flake.

Referring now to FIGS. 28 and 29, a method and apparatus for applying a thin layer of steel of controlled chemistry to a slab is shown.

When the slab is forged in the hot harmonic press 36, small amounts of the slab metal will be forced into interstices between the platens 212', 213' and the side restraints 243, 244. This results in lips of steel being formed at each edge. Where the slab is used without further processing, after forging for conversion to strip, rod bar or the like, these lips are scarfed off. Where a thin layer of controlled chemistry is desired, the lips are used to advantage.

More specifically, the slab produced by the hot press 36 is reheated in a furnace, the exit of which is shown schematically at 390. The reheated billet is passed under a high-pressure descaler 391 and then fed to a powder application assembly shown generally at 392. The assembly feed hoppers for supplying powder. Three hoppers are shown to indicate a coarse supply hopper 393, a medium 394 and a fine supply hopper 395. When the lead edge of a hot slab 396 commences to pass into the powder applicator, a heat sensing detector 397 opens the appropriate and selected ones of the hoppers to cause powder to be fed onto the surface of the slab. As indicated, there are lips along the edges of the slab and these extend vertically as viewed in FIG. 28. These lips retain the powder against lateral displacement. The slab then passes under pairs of pinch rolls 399, 400 so that the deposited powder forms a layer of steel of the chemistry of the applied powder on the surface of the slab. Outstanding results can be achieved with the powder if it is compressed with the harmonic press described in Section VIII rather than the pinch rolls shown.

Where it is desirable to make a "sandwich" with a layer of steel formed from the powder on each surface, the slab 396 is inverted as indicated by the phantom lines of FIG. 28 and fed to another powder application assembly 402 which is the same as the assembly 392 previously described. The resultant finished product is shown in cross section in FIG. 29. There, slab lips are identified by the numerals 403 and are shown of exaggerated size for clarity of illustration. The finished layers formed from the powder are identified by the numerals 404, 405 and are also of greatly exaggerated thickness for clarity of illustration in the drawing.

As is suggested previously, it is also possible to make a finished slab in which a layer formed from powdered metal is between two layers formed from scrap. In that instance a hot slab 396 is fed through the powder applicator 392, a second hot slab is placed on top of it and then the two slabs with a layer of powder therebetween are fed through a hot harmonic press of the type described in detail in Section VIII.

Although not a primary aim of this invention, important results have been obtained by utilizing a 100 percent powder steel charge. There are known methods of making high quality powder steel, the best utilizing inert gas atomization techniques with controlled powder removal to produce grape-clusters of powdered particles. When working with this type of charge, it has been found best for high production purposes to continuously bail or roll powder into thick ribbons (8 inches thick) while moderately warm (up to 1250°F.) and under an inert atmosphere shield to achieve green strength densities 60–95 percent. The powder is gravity fed downwardly between compacting rolls and the output is directly and protectively heated to the temperature range of this invention for compacting by a harmonic press within the strain rate levels and other parameters as previously discussed for scrap metal.

X. FLAKE PRODUCTION

As indicated, there are times when the supply of appropriate scrap may be interrupted due to strikes, fires, or the like. In addition, the chemistry of a finished product can be controlled if, as previously indicated, metal powder is dispersed in with the scrap. Similarly, the chemistry can be controlled if steel flake is distributed through the scrap prior to the baling operation.

Figure 30:
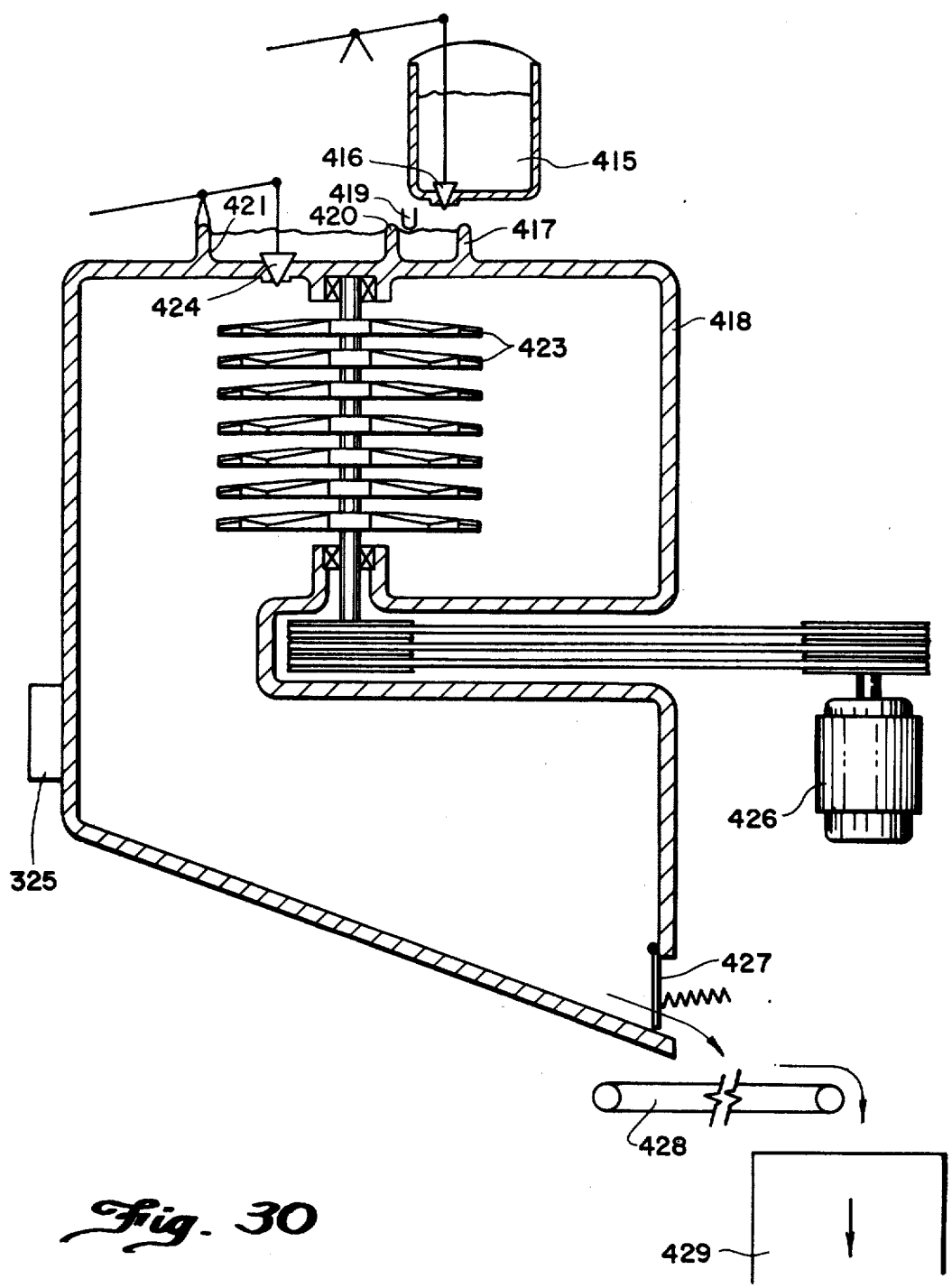

In FIG. 30, a method and apparatus are shown for inexpensively making flake which can be used for chemistry control or maintaining a production line operative when the scrap is for one reason or another not available.

A supply ladle 415 is provided. The supply ladle brings a quantity of molten metal to the flake production device. A control stopper 416 is opened to permit the molten metal to flow out of the supply ladle. The metal flows into a tundish 417 supported on the top of a crucible 418. A skimmer 419 is provided to prevent slag and other surface foreign matter on the metal in the tundish 417 from flowing over a weir 420 into a feed reservoir 421.

When it is desired to make steel flake, ceramic mixers 423 are caused to rotate. Each of these mixers will have on the order of eight blades. When a feed stopper 424 is opened, molten steel flows from the reservoir 421 downwardly onto the ceramic mixers. When the steel strikes the mixers it is flung outwardly by centrifugal force against the walls of the crucible 418. The walls of the crucible 418 are kept sufficiently cool so that the metal chills in the form of flake on the walls of the crucible. A vibrator 425 is provided to shake the flake loose from the crucible walls. The ceramic mixers are driven by a suitable variable speed motor 426, which is adjusted in speed until flake of the desired size is being produced.

The crucible is maintained filled with an inert gas to prevent chemical reactions of the molten steel as it is converted to flake. Accordingly, an exit door 427 is provided to permit the flake to escape when it is formed but to maintain the integrity of the inner atmosphere within the crucible 418. The flake is transported by a conveyor 428 to a supply hopper 429 which supplies the baler 21. The flake is made into steel according to the process previously described in detail with respect to the scrap.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of treating a bale of selected steel scrap to convert the scrap to a solid mass of steel usable in a manufacturingg operation, comprising the steps of:
    a. heating the bale in a furnace while maintaining the bale constituents in a solid state, at least a portion of the heating being conducted in a controlled environment to control chemical reactions involving the bale constituents;
    b. impacting surfaces of the bale with a pair of opposed platens;
    c. limiting lateral dissipation of the impaction forces by constraining other surfaces of the bale to prevent lateral movement of the bale constituents beyond such constraint;
    d. said impacting of the bale being at a sufficiently greate angular velocity to cause molecular migration among pieces of scrap in the bale while the inertia of rest of the bale constituents and the mechanical interconnection of the bale constituents inhibit longitudinal dissipation of the impaction forces such that bale elongation occurs primarily due to compaction of the bale to a substantially solid body; and,
    e. thereafter continuing the impaction of the body until the body is a solid mass of steel in which the surfaces of the constituents have been welded to one another by molecular migration resulting from such impaction.

2. The method of claim 1 wherein the bale is heated to from 1200°F. to 2350°F. while in said furnace.

3. The method of claim 1 wherein the bale is impacted at sufficient angular velocity to fracture and disperse dirt particles on surfaces of the bale constituents.

4. The method of claim 1 wherein the continued impaction is achieved by repetitively impacting the body with opposed platens while perimetrally confining the body.

5. The method of claim 1 wherein the bale impaction is performed with a harmonic press.

6. The method of claim 4 wherein said platens impact the bale at a rate of at least four cycles per second.

7. The method of claim 1 additionally including the step of converting the solid mass to a sheet of steel by feeding the solid mass while still hot to and through a mill of the planetary type.

8. The method of claim 7 wherein the mean temperature of the solid mass when fed to the mill is within the range of about 1200°F. to 2350°F.

9. The method of claim 1 wherein the step of heating is carried out in a furnace the heating and atmosphere within which are controlled by a method comprising the steps of:
  a. providing a pressure-tight first zone of heating having a plurality of top and side burners, each of said burners being supplied with 75–85 percent stoichiometric mixture of natural gas and ambient air, such mixute being combusted to achieve an atmosphere temperature within said first zone of up to 1292°F.;
  b. providing a pressure-tight second zone of heating having a plurality of top and side burners, each of said burners being supplied with a 45–55 percent stoichiometric mixture of natural gas and air, at least a portion of said air being preheated by the latent heat of the combusted products from said first zone of heating, said mixture of said second zone being combusted to achieve an atmosphere temperature therein of over 1800°F.; and,
  c. maintaining said atmosphere content and temperature within each zone by regulating the input of natural gas thereto in a manner whereby said input is varied between a minimum necessary to achieve stoichiometric mixtures and amounts in excess thereof.

10. The method of claim 1 wherein the step of heating is carried out in a furnace the heating and atmosphere within which are controlled by a method comprising the steps of:
  providing a pressure-tight zone of heating having a plurality of burners, each of said burners being supplied with a mixture of 45–55 percent stoichiometric mixture of natural gas and pure oxygen; and,
  b. said mixture being combusted within said burners to provide an atmosphere temperature within said zone of at least 1250°F. and being characterized by heavily reducing combustion products consisting of at least 15 percent CO and 60 percent $H_2$.

11. The method of claim 1 wherein the step of heating is carried out in a two-zone furnace including:
  a. a furnace housing defining first and second heating zones therein;
  b. a first heating zone having a plurality of heaters for achieving a temperature within said first zone of up to 1292°F.;
  c. a second heating zone having a plurality of heaters for achieving a temperature within said second zone of over 1800°F.;
  d. said housing being provided with entrance and exit doors at the entrance and exit of each of heating zones; and,
  e. each of said doors being provided with a pressure-tight seal comprising troughs filled with molten metal such as liquid lead or mercury into which depending door edges are submerged.

12. The method of claim 11 wherein the furnace used to carry out the step of heating is further characterized by each of said doors including an inverted, substantially L-shaped plate having a depending upper edge and a depending lower edge and a separate trough is provided for each of said depending edges.

13. The method of forging a bale of selected steel scrap with a press of the harmonic type having opposed platens mounted on eccentrics for relative movement to form a solid steel mass, comprising the steps of:
  a. moving a bale of selected steel scrap along a path of travel between opposed platens of a harmonic press;
  b. constraining the platens for movement such that any point on each of said platens transcribes an initial forging path which is substantially reciprocal and transverse to said path of travel;
  c. feeding a leading end of the bale along said path of travel and between said platens to commence a forging compaction of the bale; and,
  d. changing the constraint on said platens during forging until each such point traverses a substantially elliptical forging path having a major axis which extends longitudinally relative to the path of travel such that the platens impact the bale with a rapid compaction stroke, remain in engagement with the bale to self-feed bale along the path of travel, and subsequently disengage the bale for a rapid return stroke.

14. The method of forging a bale of selected steel scrap with a press of the harmonic type having opposed platens mounted on eccentrics for relative movement, to convert the scrap to a solid mass of steel comprising the steps of:
  a. moving the bale along a path of travel between the platens of a harmonic press;
  b. constraining the platens for movement such that any point on each of said platens transcribes an initial forging path which is substantially reciprocal and transverse to said path of travel;
  c. feeding a leading end of the bale along said path of travel and between said platens to commence a forging compaction of the bale; and,
  d. thereafter changing the constraint on said platens such that each such point traverses a subsequent forging path having a feed motion paralleling the path of travel such that the press self feeds the bale as it is forged.

15. The method of claim 14 wherein said subsequent forging path is substantially, elliptical having a major axis which extends longitudinally relative to the path of travel.

16. The method of claim 14 wherein the change to said subsequent forging path is accomplished by moving a pair of adjustable link means connected to said platens.

17. The method of claim 16 wherein the adjustment of the link means associated with each of said platens in carried out in synchronism.

18. The method of claim 14 wherein each of said platens has a forward engagement portion, a central serrated feed portion and a trailing smoothing portion, and wherein the change of the constraint of the platens is accomplished after a bale is fed until its leading surface is between the central feeding portions.

19. The method of claim 18 additionally including the step of again changing the constraint on said platens after a trailing edge of the bale commences to pass between said platens.

20. The method of claim 19 wherein the step of again changing the constraint is performed as the trailing edge moves from a location between said feeding portions to a location between said trailing smoothing portions.

21. The method of claim 14 wherein the changing of the constraint on said platens is performed to optimize the self feed rate of the press for the bale being impacted.

22. The method of forging a bale of selected steel scrap with a press of the harmonic type having opposed platens mounted on eccentrics for relative movement to convert the scrap to a solid mass of steel, comprising the steps of:
   a. moving the bale along a path of travel between the platens of a harmonic press;
   b. constraining the platens for movement such that any point on each of said platens transcribes a substantially elliptical initial forging path having its major axis transverse to said path of travel;
   c. feeding a leading end of the bale along said path of travel and between said platens to commence a forging compaction of the bale; and,
   d. thereafter changing the constraint on said platens such that each such point traverses a subsequent forging path having greater amplitude in directions paralleling the path of travel than said initial forging path.

23. The method of claim 22 wherein said subsequent forging path is substantially elliptical having a major axis which extends longitudinally relative to the path of travel.

24. The method of claim 23 wherein the major axis of said subsequent forging path is generally parallel to the path of travel.

25. The method of claim 22 wherein said step of changing the constraint is accomplished by moving a pair of adjustable link means each connected to a separate one of said platens.

26. The method of claim 25 wherein the adjustment of said link means is conducted in synchronism.

27. The method of claim 24 wherein each of said platens has a forward engagement portion, a central serrated feed portion and a trailing smoothing portion, and wherein the change of the constraint of the platens is accomplished after a bale is fed until its leading surface is between the central feeding portions.

28. The method of claim 27 additionally including the step of again changing the constraint on said platens after a trailing edge of the bale commences to pass between said platens.

29. The method of claim 28 wherein the step of again changing the constraint is performed as the trailing edge moves from a location between said feeding portions to a location between said trailing smoothing portions.

30. The method of claim 24 wherein the changing of the constraint on said platens is performed to optimize the self feed rate of the press for the bale being impacted.

31. The method of operating a harmonic press of the type having a pair of opposed platens mounted on eccentrics, to compact a bale of selected steel scrap into a solid steel mass, comprising the steps of:
   a. constraining movement of said platens so that each transcribes substantially an elliptical forging path having a major axis transverse to a path of bale travel;
   b. feeding a a bale of selected steel scrap along said path of travel to bring a leading edge of the bale into contact with the platens;
   c. continuing the feed until a leading portion of the bale has been compressed substantailly to its finished dimension by said press and there is substantial surface contact between the platens and the bale each time the platens impact the bale; and,
   d. thereafter adjusting the forging path of the platens such that any given point on a platen traverses a forging path having a bale feed motion paralleling the path of travel, whereby the bale is self fed by the press as it is forged.

32. The method of claim 31 wherein the adjustment of of the forging path of both platens is synchronized.

33. The method of claim 31 wherein each platen includes a lead engagement portion and a central serrated portion, and wherein the forging path adjustment is accomplished after the leading portion of a bale has commenced to feed between the serrated portions of the platens.

34. The method of claim 33 wherein each platen also includes a trailing and smoothing portion, and wherein platen forging path is further adjusted such that as a trailing portion of the bale is being impacted only by said trailing portions, the forging path is again substantially elliptical and has a major axis tranverse to the path of travel.

35. The method of claim 31 wherein the platen forging path is adjusted until the path traversed by said any given point is substantially elliptical having a major axis generally paralleling said path of travel.

36. The method of claim 12 wherein the scrap includes steel flake made from a process comprising the steps of:
   a. melting small pieces of steel;
   b. pouring the molten steel onto a rotating disc mounted within a retort having a reducing atmosphere to cause the molten steel to be flung in relatively small drops against the wall of the retort; and,
   c. maintaining the wall of the retort sufficiently cool that it has a chilling action on the molten steel causing the molten steel to solidify into flakes as it impacts against the wall of the retort.

37. The method of claim 36, additionally including the steps of:
   a. baling the flakes and compacting the flakes until the bale is from 20 percent to 40 percent solid;
   b. thereafter compressing the bale until a time when it becomes solid and substantially free of voids and then continuing to compress the solid bale until it is a slab having a transverse cross-sectional area reduced by at least 30 percent from the area at said time when the bale became solid; and,
   c. heating said bale to from 1200°F. to 2350°F. prior to the completion of step b).

38. A method of converting powdered steel to sheet steel comprising:

a. continuously mechanically compacting powdered steel into an elongate body having a transverse width at least 20 times greater than the transverse thickness thereof, and the elongate body being densified to at least 75 percent of solid density;

b. passing said elongate body through an inductive heating zone having a controlled reducing atmosphere so that said body is heated into the range of 1250°F. to 1600°F. and;

c. while in said heated condition and under the protection of said reducing atmosphere, densifying said body to a solid condition by subjecting closely spaced planar sections of said body to impulsed compacting forces along said sections and while each of said sections is perimetrally constrained, said impacting forces being effective to achieve a strain rate in the body of 4 to 24 SEC$^{-1}$ at 10–50 percent reductions.

39. A method of converting powdered steel into sheet steel comprising:

a. heating a powdered steel charge to just under 1300°F. in a slightly reducing atmosphere;

b. while under the protection of said atmosphere, mechanically densifying said heated powder into an elongate body having a transverse width at least 20 times greater than the transverse thickness and a density of at least 85 percent of solid; and, c. said powder being converted to solid steel by subjecting progressive closely-spaced planar sections of said body to impulsed compacting forces along said section planes while said body is in said heated solid-state condition, said sections being perimetrally constrained while said impacting forces are being applied at a strain rate of 4–24 SEC$^{-1}$ at 10–50 percent reductions.

* * * * *

UNITED STATES PATENT AND TRADEMARK OFFICE
CERTIFICATE OF CORRECTION

PATENT NO. : 3,943,617

DATED : March 16, 1976

INVENTOR(S) : Mark E. Whalen, et al.

It is certified that error appears in the above-identified patent and that said Letters Patent are hereby corrected as shown below:

```
Col. 5, line 35, after "provide", "an" should be -- a --
Col. 6, line 37, after "outer", "points" should be -- portions --
Col. 9, line 32, before "view", "diagrammatical" should be --
   diagrammatic --
Col. 12, after line 3, insert -- a descaling unit 46, thence --
Col. 12, line 47, "THe" should be -- The --
Col. 13, line 51, "shwon" should be -- shown --
Col. 13, line 55, after "Hooks," "now" should be -- not --
Col. 17, line 15, "whoch" should be -- which --
Col. 18, line 30, "plate" should be -- platen --

Col. 19, line 23, "forced" should be -- forces --
Col. 23, line 43, before "60-95 percent" insert -- of --
Claim 1, line 3, "manufacturingg" should be -- manufacturing --
```

Signed and Sealed this

Fifth Day of October 1976

[SEAL]

Attest:

RUTH C. MASON
Attesting Officer

C. MARSHALL DANN
Commissioner of Patents and Trademarks